United States Patent
Borngräber

(10) Patent No.: US 10,224,729 B2
(45) Date of Patent: Mar. 5, 2019

(54) BATTERY HOT SWAP CAPABLE APPARATUS

(75) Inventor: Frank Borngräber, Weissenhorn (DE)

(73) Assignee: Nokia Technologies Oy, Espoo (FI)

( * ) Notice: Subject to any disclaimer, the term of this patent is extended or adjusted under 35 U.S.C. 154(b) by 630 days.

(21) Appl. No.: 14/421,856

(22) PCT Filed: Aug. 17, 2012

(86) PCT No.: PCT/IB2012/054190
§ 371 (c)(1),
(2), (4) Date: Jun. 19, 2015

(87) PCT Pub. No.: WO2014/027224
PCT Pub. Date: Feb. 20, 2014

(65) Prior Publication Data
US 2016/0118827 A1 Apr. 28, 2016

(51) Int. Cl.
*H02J 7/00* (2006.01)
*H04W 52/02* (2009.01)
*H02J 1/10* (2006.01)

(52) U.S. Cl.
CPC .............. *H02J 7/0054* (2013.01); *H02J 1/10* (2013.01); *H02J 7/007* (2013.01); *H02J 7/0036* (2013.01);
(Continued)

(58) Field of Classification Search
CPC ............................. H02J 7/0054; H02J 7/0068
(Continued)

(56) References Cited

U.S. PATENT DOCUMENTS 5,832,282 A 11/1998 Pate et al.
6,172,478 B1 1/2001 Leppo et al.
(Continued)

FOREIGN PATENT DOCUMENTS

CN 2762449 Y 3/2006
CN 201114006 Y 9/2008
(Continued)

OTHER PUBLICATIONS

"70 Series—Super Capacitor and Backup Battery Details", Intermec, Retrieved on Feb. 15, 2012, Webpage available at :http://intermec.custhelp.com/app/answers/detail/a_d/13516/~/70-series-super-capacitor.
(Continued)

*Primary Examiner* — Richard V Muralidar
(74) *Attorney, Agent, or Firm* — Dittthavong & Steiner, P.C.

(57) ABSTRACT

It is inter alia disclosed an apparatus (10), comprising a power connector (210) configured to be connected to a removable first rechargeable energy source and configured to supply power from the first rechargeable energy source to the apparatus via a power supply line (220), a second rechargeable energy source (240), a balancing element (230) placed between the power supply line (220) and the second rechargeable energy source (240) and configured to provide power from the power supply line (220) to the second rechargeable energy in a first state of the apparatus and configured to provide power from the second rechargeable energy source (240) to the power supply line (220) in a second state of the apparatus, wherein in the first state the apparatus is configured to prevent supplying power from the second rechargeable power supply (240) to the power supply line (220).

20 Claims, 9 Drawing Sheets

(52) U.S. Cl.
CPC ......... *H04W 52/0296* (2013.01); *Y02D 70/12* (2018.01); *Y02D 70/142* (2018.01)

(58) Field of Classification Search
USPC .................................................. 320/103, 140
See application file for complete search history.

(56) References Cited

U.S. PATENT DOCUMENTS

| | | | |
|---|---|---|---|
| 6,628,107 | B1 | 9/2003 | Bang et al. |
| 6,958,905 | B2 | 10/2005 | Hong et al. |
| 7,091,701 | B2 | 8/2006 | Turner et al. |
| 8,030,800 | B1 | 10/2011 | Terrell et al. |
| 8,178,999 | B2* | 5/2012 | Burger ............... G05F 1/67 307/126 |
| 8,645,753 | B2* | 2/2014 | Yang ............... H02H 9/001 714/14 |
| 8,710,794 | B2* | 4/2014 | Rapoport ............... H02J 7/34 307/80 |
| 2005/0110468 | A1* | 5/2005 | Turner ............... G06F 1/30 320/166 |
| 2005/0168194 | A1 | 8/2005 | Stanesti et al. |
| 2009/0251007 | A1* | 10/2009 | Adams ............... G06F 1/263 307/70 |
| 2010/0315043 | A1 | 12/2010 | Chau |
| 2011/0309676 | A1 | 12/2011 | Terrell |

FOREIGN PATENT DOCUMENTS

| | | |
|---|---|---|
| CN | 201118879 Y | 9/2008 |
| DE | 4414943 A1 | 11/1994 |
| WO | 2000/042693 A1 | 7/2000 |
| WO | 2001/089055 A1 | 11/2001 |
| WO | 2007/122453 A1 | 11/2007 |
| WO | 2013/150343 A1 | 10/2013 |

OTHER PUBLICATIONS

Extended European Search Report received for corresponding European Patent Application No. 12883074.2, dated Apr. 25, 2016, 10 pages.

International Search Report and Written Opinion received for corresponding Patent Cooperation Treaty Application No. PCT/IB2012/054190, dated Apr. 18, 2013, 16 pages.

Visairo, H. et al. A reconfigurable battery pack for improving power conversion efficiency in portable devices The 7th International Caribbean Conference on Devices, Circuits and Systems (ICCDCS 2008). Apr. 28-30, 2008.

Office Action for corresponding European Patent Application No. 12 883 074.2-1804, dated Aug. 10, 2017, 9 pages.

* cited by examiner

BATTERY HOT SWAP CAPABLE APPARATUS

RELATED APPLICATION

This application was originally filed as PCT Application No. PCT/IB2012/054190 filed Aug. 17, 2012.

FIELD

Embodiments of this invention relate apparatuses comprising removable and rechargeable power supplies.

BACKGROUND

Applying energy to a mobile device is mainly done with a charger or an external power supply. Purpose of it is to supply the system with power and charge and/or maintain the battery.

The fact that many users carry one or more spare batteries with them is widely spread. Especially in the developing countries, where a mobile phone call is one of the most important use cases of the mobile device, battery ma runs out of energy quite fast. Users exchange an empty with a full charged battery simply because often the infrastructure for simple recharging is missing (no power grid, no mains).

Current problem with existing designs is that a nearly empty battery which is planned to be removed and replaced with a fully charged one forces the system to be shut down and the reboot once the fully charged battery is inserted and that the mobile terminal is switched on.

In some systems the start up and fully reboot of the system may take a couple of minutes, dependent on the complexity and usage of the mobile terminal.

SUMMARY OF SOME EMBODIMENTS OF THE INVENTION

Thus, improving user comfort when replacing an empty battery with a fully charged battery of an apparatus may be desirable.

According to a first exemplary embodiment of an aspect of the invention, an apparatus is disclosed, the apparatus comprising a power connector configured to be connected to a removable first rechargeable energy source and configured to supply power from the first rechargeable energy source to the apparatus via a power supply line, a second rechargeable energy source, a balancing element placed between the power supply line and the second rechargeable energy source and configured to provide power from the power supply line to the second rechargeable energy in a first state of the apparatus and configured to provide power from the second rechargeable energy source to the power supply line in a second state of the apparatus, wherein in the first state the apparatus is configured to prevent supplying power from the second rechargeable power supply to the power supply line.

According to a second exemplary embodiment of an aspect of the invention, a method is disclosed, the method comprising operating the apparatus in a first state, the apparatus comprising a second rechargeable energy source, a power connector configured to be connected to a removable first rechargeable energy source and configured to supply power from the first rechargeable energy source to the apparatus via a power supply line, and a balancing element placed between the power supply line and the second rechargeable energy source, the method comprising in said first state providing power from the power supply line to the second rechargeable energy source via the balancing element and decoupling the second rechargeable energy source from the power supply line such that power supply from the second rechargeable energy source to the power supply line is prevented, changing the status of the apparatus from the first state into a second state, the method comprising in the second state providing power from the second rechargeable energy source to the power supply line via the balancing element.

According to a third exemplary embodiment of an aspect of the invention, an apparatus is disclosed, which is configured to perform the method according to the first aspect of the invention, or which comprises means for performing the method according to the first aspect of the invention, i.e. means for operating an apparatus in a first state, the apparatus comprising a second rechargeable energy source, a power connector configured to be connected to a removable first rechargeable energy source and configured to supply power from the first rechargeable energy source to the apparatus via a power supply line, and a balancing element placed between the power supply line and the second rechargeable energy source, wherein in said first state power is provided from the power supply line to the second rechargeable energy source via the balancing element and the second rechargeable energy source is decoupled from the power supply line such that power supply from the second rechargeable energy source to the power supply line is prevented, and means for changing the status of the apparatus from the first state into a second state, wherein in the second state power is provided from the second rechargeable energy source to the power supply line via the balancing element.

According to a fourth exemplary embodiment of the an aspect of the invention, an apparatus is disclosed, comprising at least one processor and at least one memory including computer program code, the at least one memory and the computer program code configured to, with the at least one processor, cause the apparatus at least to perform the method according to the first aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fifth exemplary embodiment of an aspect of the invention, a computer program is disclosed, comprising program code for performing the method according to the first aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a sixth exemplary embodiment of an aspect of the invention, a computer-readable medium is disclosed, having a computer program according to the first aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

In the following, features and embodiments pertaining to all of these above-described aspects of the invention will be briefly summarized.

For instance, the power connector may represent a receptacle configured to receive the first rechargeable energy source. The power connector may comprise a plurality of contacts, wherein contacts of the plurality of contacts are configured to be electrically connected to respective contacts of the first rechargeable energy source when the first rechargeable energy source is connected to the power connector.

The first rechargeable energy source may represent any rechargeable energy source which is configured to store electrical energy and to supply this stored electrical energy. For instance, the first rechargeable energy source may represent a rechargeable battery, e.g. a lithium ion battery or a nickel metal hybrid battery or any other type of well-suited rechargeable battery, in particular any kinds of chemical rechargeable batteries, or it may represent any other kind of rechargeable energy source not representing a battery, e.g. a capacitor or electric coil or a fuel cell or the like.

The balancing element is configured to supply power from the power supply line to the second rechargeable energy source in the first state of the apparatus and is configured to provide power from the second rechargeable energy source to the power supply line in the second state of the apparatus.

Furthermore, in the first state the apparatus is configured to charge the second rechargeable energy source by power provided from the first rechargeable energy source.

The second rechargeable energy source may represent any rechargeable energy source which is configured to store electrical energy and to supply this stored electrical energy. For instance, the second rechargeable energy source may represent a rechargeable battery, e.g. a lithium ion battery or a nickel metal hybrid battery or any other type of well-suited rechargeable battery, in particular any kinds of chemical rechargeable batteries, or it may represent another type of electrical energy storage representing no battery, e.g. at least one capacitor.

For instance, the electrical storage capacity of the first rechargeable energy source may be much higher than the electrical storage capacity of the second rechargeable energy source. As an example, the storage capacity of the first rechargeable energy source may be at least ten times higher than the electrical storage capacity of the second rechargeable energy source, e.g. at least 100 times higher, e.g. at least 500 times higher, e.g. at least 1000 times higher.

Accordingly, as an example, the apparatus can be operated in the first state including charging the second rechargeable energy source by power provided from the first rechargeable energy source via the balancing element while the apparatus is simultaneously configured to decouple the second rechargeable energy source from the power supply line such that supplying power from the second rechargeable energy source to the power supply line is prevented.

Thus, in the first state, the apparatus charges the second rechargeable energy source by power supplied from the first rechargeable energy source. For instance, this charging may be performed without any supplement from an external non-rechargeable energy source connected to apparatus, e.g. a power supply being connected to an electric supply network or another apparatus providing electrical energy. Thus, for instance, only energy provided from the first rechargeable energy source may be used for charging the second rechargeable energy source. For instance, it has to be understood that charging may also include keeping the energy of the second rechargeable energy source at an approximately constant level when energy level of the second rechargeable energy source has reached a predefined level.

Thus, in the first state, energy of the first rechargeable energy source can be used to charge the second rechargeable energy source and maintain energy in the second rechargeable energy source by means of the balancing element Furthermore, in the first state power from the first rechargeable energy source can be provided to the apparatus, e.g., to at least one electrical entity of the apparatus.

Furthermore, the apparatus can be operated in the second state.

In this second state, the balancing element provides power from the second rechargeable energy source to the power supply line of the apparatus.

For instance, the apparatus may switch into the second state in case it is detected that the removable first rechargeable energy source is removed from the power connector. Thus, as an example, power supply of at least one electrical entity connected to power supply line may be performed by power provided from the second rechargeable energy source in the second case and it is not necessary that the first rechargeable energy source is connected to the power connector so long as there is enough energy stored in second rechargeable energy source. Furthermore, as an example, other rules for switching the apparatus in the first state and for switching the apparatus back to the second state may be applied.

Thus, in the first state the balancing element may be assumed to represent an element which fixes one electrical input quantity provided at an input of the balancing element and varies the corresponding electrical output quantity provided at an output of the balancing element or which fixes one electrical output quantity provided at the output to a predefined value and varies the corresponding electrical input quantity provided at the input. As an example, the electrical quantity may represent one of voltage or current. For instance, the fixed electrical input quantity may represent the voltage of the power supply line, which may represents the input voltage of the balancing element in the first state, wherein the output voltage of the balancing element may represent the corresponding variable output quantity. Thus, the electric output quantity provided at the output may be balanced with respect to the fixed electric input quantity at the input in the first state under this non-limiting example. Accordingly, for instance, the balancing element may be assumed to decouple an electrical input quantity from the corresponding electrical output quantity. Furthermore, the balancing element may prevent that energy is provided from the output to the input in the first state.

Furthermore, as an optional example, in the second state the balancing element may be configured to be operated in an opposite direction compared to the first state, i.e., input and output of the balancing element in the second state are exchanged compared to the first state, and wherein in the second state the balancing element may also be assumed to represent an element which fixes one electrical input quantity provided at the input of the balancing element and varies the corresponding electrical output quantity provided at the output of the balancing element or which fixes one electrical output quantity provided at output and varies the corresponding electrical input quantity provided at input, as explained with respect to the first state. Furthermore, the balancing element may prevent that power is provided from the output to the input in the second state.

Or, as another example, in the second state the balancing element may be configured to operate as a switch which connects the second rechargeable energy source with the power supply line, wherein this switch is opened in the first state.

For instance, this second state may be used during a hot swap of the first rechargeable energy source.

As an example, when the first rechargeable energy source is nearly empty the first rechargeable energy source is to be removed from the power connector and replaced with a fully charged power supply, which then represents the new first rechargeable energy source after being connected to the power connector. Due to the second state of the apparatus power supply to the apparatus can still be provided through the power line by means of power provided by the second rechargeable energy source. Thus, for instance, no shut down of the apparatus is necessary even in case the first rechargeable energy source is replaced and, as an example, no reboot is necessary after the new first rechargeable energy source is connected to the power connector.

This may show the advantage that a start up of the system and fully reboot of the system, which may take a couple of minutes, dependent on the complexity and usage of the apparatus, e.g., a mobile terminal, can be avoided.

Furthermore, due to the charging of the rechargeable energy source in the first state with energy provided from the first rechargeable energy source, it may be ensured that there is sufficient energy stored in the second rechargeable energy source even in case the apparatus represents a mobile apparatus which is not connected to an external power supply. As an example, this may allow maintaining an ongoing data download or a call via WLAN while swapping the first rechargeable energy source.

Accordingly, for instance, the use of the second rechargeable energy source as an energy source in the case of first rechargeable energy source hot swap allows this hot swap.

According to an exemplary embodiment of an aspect of the invention, the balancing element comprises a regulator connected to the power supply line and to the second rechargeable energy source, the method comprising drawing power from the power supply line by the regulator and charging the second rechargeable energy source via the regulator in the first state.

For instance, the regulator may be configured to regulate the voltage provided at the power supply line down to a predefined voltage level in order to charge the second rechargeable energy source with this predefined voltage level, and/or, the regulator may be configured to regulate the voltage provided at the power supply line up to a predefined voltage level in order to charge the second rechargeable energy source with this predefined voltage level. For instance, the predefined voltage level may be the same for both scenarios. Thus, the regulator may regulate the voltage down to the predefined voltage level in case the voltage of the power supply line is higher than the predefined voltage level, and the regulator may regulate the voltage up to the predefined voltage level in case the voltage of the power supply line is lower than the predefined voltage level. Thus, as an example, the regulator may represent a Switch Mode Power Supply (SMPS) which may operate as a Buck SMPS for regulating the voltage down and/or as Boost SMPS for regulating the voltage up. For instance, this regulator may be assumed to represent the above-mentioned element which in the first state fixes one electrical input quantity provided at an input of the balancing element and varies the corresponding electrical output quantity provided at an output the balancing element or which fixes one electrical output quantity provided at the output to a predefined value and varies the corresponding electrical input quantity provided at the input, wherein the input is connected to the power supply line and the output is connected to the second rechargeable energy source.

For instance, in case the first rechargeable energy source represents a battery, the voltage of this battery may be in the range from 2.5V to 4.4V, and the regulator may be configured to charge at a predefined voltage, which may for instance be 3.0V or any other well suited predefined voltage in accordance with the second rechargeable energy source.

For instance, the regulator may further be configured to prevent that power is supplied from the second rechargeable energy source to the power supply line. Thus, the regulator may represent a unidirectional element which is configured to supply power only in one direction starting from the power supply line to the second rechargeable energy source.

According to an exemplary embodiment of an aspect of the invention, the balancing element comprises a switch, wherein in the first state the switch is configured to disconnect the second rechargeable energy source from the power supply line and in the second state the switch is configured to connect the second rechargeable energy source with the power supply line.

The switch is configured to be open in the first state of the apparatus, i.e., no power can be provided from the second rechargeable energy source through the balancing element to the power supply line in the first state, and no charging can be performed through the balancing element in the first state. Furthermore, in the second state the switch is configured to be closed. For instance, the balancing element may comprise a control input configured to receive a control signal for switching the balancing element in accordance with the first or second state, wherein the control signal is indicative of the state of the apparatus.

For instance, this switch may be placed in parallel to the above mentioned regulator.

As an example, the switch may represent a transistor, e.g. a field-effect transistor (FET), or a mechanical switch, e.g. a relais, like a mico-mechanical switch or any other well-suited switch, e.g. a high power controllable switch.

According to an exemplary embodiment of an aspect of the invention, in the second state the regulator is configured to draw power from the second rechargeable energy source in order to provide power to the power supply line.

For instance, the balancing element may represent a bidirectional regulator which is configured to provide power from the power supply line to the second rechargeable energy source in the first state thereby preventing that power is supplied form the second rechargeable energy source to power supply line in the first state of the apparatus. Thus, the second rechargeable energy source can be charged by means of the regulator in the first state, wherein in the first state the regulator can only provide power in the direction starting from the power supply line to the second rechargeable energy source. The charging may be performed as described with respect to the above mentioned regulator. For instance, any explanations regarding the charging functionalities of the above mentioned regulator may also hold for the charging functionalities of the combined regulator/decoupling when the apparatus is in the first state.

Furthermore, in the second state of the apparatus the regulator may be configured to change the direction of providing power such that power can be provided from the second rechargeable energy source to the power supply line in the second state. Accordingly, the regulator may be considered to represent a switchable bidirectional regulator.

As an example, in the second state the switchable bidirectional regulator might be configured to charge the first rechargeable energy source, if already connected to the power connector, by power provided from the second rechargeable energy source.

For instance, the regulator/balancing element may comprise a control input configured to receive a control signal for switching the regulator/balancing element in accordance with the first or second state, wherein the control signal is indicative of the state of the apparatus 300'.

For instance, this regulator may be assumed to represent the above-mentioned an element which in the first state fixes one electrical input quantity provided at an input of the balancing element and varies the corresponding electrical output quantity provided at an output the balancing element or which fixes one electrical output quantity provided at the output to a predefined value and varies the corresponding electrical input quantity provided at the input, wherein the input is connected to the power supply line and the output is connected to the second rechargeable energy source, and wherein in the second state the regulator may be configured to be operated in an opposite direction compared to the first state, i.e., input and output of the regulator in the second state are exchanged compared to the first state, and wherein in the second state the regulator may also be assumed to represent an element which fixes one electrical input quantity provided at the input of the balancing element and varies the corresponding electrical output quantity provided at the output of the balancing element or which fixes one electrical output quantity provided at output and varies the corresponding electrical input quantity provided at input, as explained with respect to the first state. Furthermore, the balancing element may prevent that power is provided from the output to the input in the second state. Thus, in the first state the input of the regulator may be assumed to be connected with the power supply line and the output may be assumed to be connected to the second rechargeable energy source, whereas in the second state the output of the regulator may be assumed to be connected with the power supply line and the input may be assumed to be connected to the second rechargeable energy source.

According to an exemplary embodiment of an aspect of the invention, the apparatus comprises a second power supply line and at least one electrical entity connected to the second power supply line, wherein the second rechargeable energy source is connected to the second rechargeable power line.

For instance, this second power supply line may be connected to at least one electrical entity of the apparatus, wherein this at least one electrical entity may represent an electrical entity having a power consumption with power peaks, wherein the second rechargeable energy source may act as a kind of energy buffer for providing sufficient energy to the at least one electrical entity even in the case that power peaks occurs.

Accordingly, for instance, the use of the second rechargeable energy source as an additional energy storage media allows for compensating power peaks.

According to an exemplary embodiment of an aspect of the invention, one of the at least one electrical entity connected to the second power supply line represents a power amplifier.

For instance, this power amplifier may represent an audio power amplifier and/or represent a radio frequency (RF) amplifier.

According to an exemplary embodiment of an aspect of the invention, said second rechargeable energy source is one of: a battery; and at least one capacitor.

For instance, the capacitance of the at least one capacitor may be in a range between 50 mF and 4 F, e.g. between 100 mF and 1 F, e.g. approximately or exactly 100 mF, 200 mF, 300 mF, 400 mF, 500 mF, 600 mF, 700 mF, 800 mF, 900 mF, 1000 mF, but, as another example, the capacitance may have other values being different from the above mentioned ranges.

For instance, in case the second rechargeable energy source comprises two or more capacitors, at least two capacitors may be connected in parallel and/or connected in series.

Furthermore, as an example, the optional regulator may have a balancer option in case that the second rechargeable energy source comprises at least two capacitors placed in series.

According to an exemplary embodiment of an aspect of the invention, the apparatus is configured to be switched from the first state in the second state if a first switching rule is fulfilled and the apparatus is configured to be switched from the second state in the first state if a second switching rule is fulfilled.

For instance, the first switching rule comprises at least one rule associated with a switch of the apparatus from the first state into the second state, and the second switching rule comprises at least one rule associated with a switch of the apparatus from the second state into the first state. As an example, said rules may depend on at least one of at least one voltage of the apparatus and/or at least one current floating in the apparatus and/or at least one state of charge of the first rechargeable energy source and/or the second rechargeable energy source, wherein a controller of the apparatus may be configured to applied said rules of the first switching rule in order to switch the apparatus from the first into the second state and may be configured to apply rules of the second switching rules in order to switch the apparatus from the second state into the first state, wherein the controller may be configured to switch the balancing element in the first state or in the second state in order to support an optimized point of operation of the apparatus based on the first and second switching rule.

Thus, when the apparatus is in the first state, it may be checked whether a rule of the first switching rule is fulfilled, and if yes the apparatus is switched from the first state into the second state. Then, as an example, it may be checked whether a rule of the second switching rule being associated with the rule of the first switching rule which was previously fulfilled is fulfilled, and if yes the apparatus may be switched from the second state into the first state. For instance, this rule of the second switching rule being associated with a respective the rule of the first switching rule may indicate that the situation which led to the switch from the first state into the second state detected based on the respective rule of the first switching rule is not present anymore such that the apparatus can be switched from the second state back to the first state.

Or, as another example, in the second state it may be checked whether any of the at least one rule of the second switching rule is fulfilled, and if yes the apparatus may be switched from the second state into the first state.

According to an exemplary embodiment of an aspect of the invention, said first switching rule comprises at least one of: a disconnect rule associated with a connecting status of the first rechargeable energy source with respect to the power connector, a first voltage rule indicating that the voltage at the power supply line is less than a predefined voltage associated with the first state, and a first combined voltage rule based on the voltage at the power supply line and on the voltage at the second rechargeable energy source indicating an under voltage of the voltage of the power supply line with respect to the voltage of the second rechargeable energy source.

As an example, the predefined voltage level associated with the first state may represent a voltage being a little bit higher than the empty voltage level associated with the first rechargeable energy source and lower than the full voltage level associated with the fully charged first rechargeable energy source. Furthermore, as another example, the predefined voltage level may approximately or exactly represent an empty voltage level associated with the first rechargeable energy source.

For instance, the first combined voltage rule may indicate to switch the apparatus from the first state in the second state if the voltage at the power supply line is less than a first predefined voltage level and the voltage at the second energy source exceeds a second predefined voltage level, and, optional, if it is detected that the first energy source is connected to the power connector, e.g. based on the connect rule. The first predefined voltage level is lower than the second predefined voltage level. Thus, this first combined voltage rule may be used to detect an under voltage of the first rechargeable energy source compared to the voltage of the second rechargeable energy source. For instance, said first predefined voltage level may be 3.4V and the second predefined voltage level may be 4.4V, but any other well-suited voltage levels may be used as well, e.g. depending on the type of rechargeable energy sources. Thus, when the apparatus is switched in second state in step based on the fulfilled first combined voltage rule, the balancing element may provides power from the second energy source to the first energy source which may include charging the first energy source. For instance, in this second state and if the first combined voltage rule was fulfilled, the balancing element may be controlled to balance the voltages of the power supply line and the second energy source to a voltage level between the first predefined voltage level and the second predefined voltage level, wherein this voltage level may for instance represent the arithmetic mean between the first and second predefined voltage level.

According to an exemplary embodiment of an aspect of the invention, said second switching rule comprises at least one of: a connect rule associated with a connecting status of the first rechargeable energy source with respect to the power connector, a second voltage rule indicating that the voltage at the power supply line exceeds a predefined voltage associated with the second state, and a third voltage rule based on the voltage at the power supply line indicating that there is no under voltage of the voltage of the power supply line.

For instance, the connect rule may be associated with the disconnect rule of the first switching rule, the second voltage rule may be associated with the first voltage rule of the first switching rule and the third voltage rule may be associated with the first combined voltage rule of the first switching rule.

For instance, the predefined voltage level associated with the second state may represent a voltage being a little bit higher than the predefined voltage level of the first voltage rule associated with first state and may be lower than the full voltage level associated with the fully charged second rechargeable energy source. Furthermore, as another example, the predefined voltage level associated with the second state may approximately or exactly represent empty voltage level associated with the second rechargeable power supply. This empty voltage level may represent the minimum voltage level needed to keep the apparatus at least partially alive, e.g. in the normal mode or in the power saving mode.

As an example, the third voltage rule may indicate to switch the apparatus from the second state in the first state if an under voltage of the first energy source is not present anymore. For instance, this third voltage rule may indicate to switch to the first state if the voltage of the power supply line exceeds a third predefined level. Furthermore, this third voltage rule may indicate to switch to the first state of the voltage of the power supply line exceeds the third predefined level. Furthermore, as optional example, the third voltage rule may comprise checking whether the voltage of the second energy source is less than a fourth predefined level, wherein the third predefined level is higher than the fourth predefined level.

According to an exemplary embodiment of an aspect of the invention, the apparatus comprises a first control signal line being indicative of the connecting status of the first rechargeable energy source, wherein said disconnect rule or connect rule is applied based on a signal of the first control signal line.

For instance, the apparatus may comprise means for detecting whether the first rechargeable energy source is connected or removed from the power supply, wherein this means for detecting whether the first rechargeable energy source is connected or removed from the power supply might be configured to output the control signal being indicative that the first rechargeable energy source is connected or disconnected. Thus, if the first control signal indicates that the first rechargeable energy source is connected, the apparatus may be configured to be switched into the first state (or maintain the first state), e.g. in accordance with the above mentioned connect rule, and if the first control signal indicates that the first rechargeable energy source is disconnected, the apparatus may be configured to be switched into the second state (or maintain the second state), e.g. in accordance with the above mentioned disconnect rule.

As an example, the means for detecting whether the first rechargeable energy source is connected or removed from the power supply might include an electro-mechanical sensor configured to sense whether the first rechargeable energy source is connected or removed from the power connector, e.g. a switch.

As another example, the means for detecting whether the first rechargeable energy source is connected or removed from the power supply might determine whether the first rechargeable energy source is connected or removed from the power connector based on the electrical status of a contact of the power connector.

According to an exemplary embodiment of an aspect of the invention, the power connector comprises a plurality of contacts configured to be connected to respective contacts of the first rechargeable battery, wherein the signal of the control signal line depends on the signal of a first contact of the plurality of contacts of the power connector.

For instance, this first contact can be used for determining whether the first rechargeable energy source is connected or removed from the power connector, wherein the signal of the control signal line depends on the signal of this first contact of the power connector. Thus, for instance, the control signal of the control signal line may indicate that the first rechargeable energy source is connected to the power supply connector if the respective contact of the first rechargeable energy source is connected to the first contact, and the control signal of control signal line may indicate that the first rechargeable energy source is removed from the power supply connector if the respective contact of the first rechargeable energy source is disconnected from the first contact. For instance, the first contact may be configured to be connected to a respective identification contact of the first rechargeable energy source, e.g. battery size indicator or digital battery interface.

According to an exemplary embodiment of an aspect of the invention, at least two contacts of the plurality of contacts of the power connector are associated with ground and power, and wherein the first contact and the at least two contacts associated with ground and power of the power connector are arranged in a way that the first contacts loses contact with the respective contact of the first rechargeable energy source before one of the at least two contacts loses contact with the respective contact of the first rechargeable energy source when the rechargeable energy source is removed from the power connector.

According to an exemplary embodiment of an aspect of the invention, the apparatus comprises at least one electrical entity, wherein in the second state the apparatus is configured to set at least one of the at least one electrical entity in a power saving mode and/or at least one functionally of the apparatus in a power saving mode.

For instance, in case the power saving mode is activated at least one of the at least one electrical entity is set to hardware power saving mode and/or at least one functionally of the apparatus, e.g. a software functionality, may be set to a power saving mode. As an example, at least one electrical entity of the at least one electrical entity may be powered down or at least be driven with reduced voltage in order save power, or some parts but not all parts of an electrical entity may be powered down. Furthermore, as an example, power consuming algorithms performed by software, e.g. performed by software on a processor of the apparatus, might be stopped in the power saving mode. Furthermore, the power mode may also comprise a sleep mode for at least one electrical entity or the whole apparatus.

Thus, for instance, power hungry functions or hardware components, i.e. electrical entities, of the apparatus may be disabled or for the time the first rechargeable energy source is swapped, e.g. a radio frequency component and/or display light.

According to an exemplary embodiment of an aspect of the invention, the apparatus comprises a voltage detector connected to the power supply line, wherein the voltage detector is configured to output a second control signal if the detected voltage is less than a predefined voltage level.

As an example, the predefined voltage level may represent a voltage being a little bit higher than the empty voltage level associated with the first rechargeable energy source and lower than the full voltage level associated with the fully charged first rechargeable energy source. Furthermore, as another example, the predefined voltage level may approximately or exactly represent empty voltage level associated with the first rechargeable energy source.

According to an exemplary embodiment of an aspect of the invention, the apparatus comprises at least one electrical entity, wherein based on the second control signal the apparatus is configured to perform at least one of: setting at least one of the at least one electrical entity and/or at least one functionality of the apparatus in a power saving mode, and indicating an information via a user interface.

For instance, the second control signal on second control signal line may be used by the apparatus for indicating an information to a user via a user interface if the voltage level is less then the predefined voltage level. E.g., this information may inform the user that the first rechargeable energy source is nearly empty and that is advisable to replace the first rechargeable energy source with a fully charged first rechargeable energy source. As an example, this information may comprise an displaying an icon on a display, wherein this icon may represent a static icon or a blinking icon, or this information may be provided to the user via a LED, e.g. a blinking LED, or by means of any other well-suited kind of information transfer to the user.

Furthermore, in case the apparatus is operated in the second state, second control signal on second control signal line may also be used by the apparatus for indicating an information to a user via a user interface if the voltage level is less then the predefined voltage level. For instance, this may information may then be indicative the energy of the second rechargeable energy source is nearly empty and thus the user has to hurry up with replacing the first rechargeable energy source. For instance, the predefined voltage level used by the voltage detector in the second state of the apparatus may differ from the predefined voltage level used by the voltage detector in the first state of the apparatus, wherein the predefined voltage level associated with the second state may be adapted to an empty voltage level of the second rechargeable energy source, e.g., the predefined voltage level associated with the second state may represent a voltage being a little bit higher than the empty voltage level associated with the second rechargeable energy source and lower than the full voltage level associated with the fully charged second rechargeable energy source. Furthermore, as another example, the predefined voltage level associated with the second state may approximately or exactly represent empty voltage level associated with the second rechargeable power supply. This empty voltage level may represent the minimum voltage level needed to keep the apparatus at least partially alive, e.g. in the normal mode or in the power saving mode.

Furthermore, as another example, the second control signal on second control signal line may be used by the apparatus to set at least one of the at least one electrical entity and/or at least one functionality of the apparatus in a power saving mode.

According to an exemplary embodiment of an aspect of the invention, the apparatus is configured to set at least one of the at least one electrical entity and/or at least one functionality of the apparatus in a power saving mode based on the second control signal is further based on the state of the apparatus, wherein a first group of at least one electrical entity and/or at least one functionality is set in a power saving mode based on the second control signal when the apparatus is not in the second state, and wherein a second group of at least one electrical entity and/or at least one functionality is set in a power saving mode based on the second control signal when the apparatus is in the second state.

For instance, a first group of at least one electrical entity and/or at least one functionality of apparatus may defined, wherein apparatus is configured to set the at least one electrical entity and/or the at least one functionality of the first group in a power saving mode in case the second control signal indicates that the voltage is less the predefined voltage level, wherein this may be independent from the state of the apparatus, i.e. whether the apparatus is in the first or the second state. As an example, this first group of at least one electrical entity and/or at least one functionality may comprise electrical entities or functionalities that are not so much important and does not limit normal operation of the apparatus significantly. Accordingly, power consumption can be reduced compared to the normal mode without any reduction in power consumption thereby enhancing the time period until the first rechargeable energy source is empty.

As an example, the apparatus may be configured to deactivate the power saving mode of the at least one electrical entity and/or the at least one functionality of the first group in case the second control signal indicates that the voltage is less the predefined voltage level independent from the state of the apparatus, or the apparatus may be configured to deactivate the power saving mode of the at least one electrical entity and/or the at least one functionality of the first group in case the second control signal indicates that the voltage is less the predefined voltage level independent and if the apparatus is in the first state. For instance, in the latter case, it might be prevented that the power save mode of the first group is deactivated when the second rechargeable energy source provided power to the power supply line in the second state of the apparatus.

Furthermore, a second group of at least one electrical entity and/or at least one functionality of apparatus may defined, wherein the at least one additional electrical entity and/or at eat least one functionality of the second group may represent additional entities or functionalities compared to the first group or wherein the second group may include the at least one electrical entity and/or at least one functionality of the first group and comprise at least one additional electrical entity and/or at least one additional functionality compared to the first group.

For instance, the apparatus is configured to set the at least one electrical entity and/or the at least one functionality of the second group in a power saving mode in case the apparatus is in the second state. Furthermore, for instance, the apparatus may be is configured to deactivate the power saving mode of the at least one electrical entity and/or the at least one functionality of the second group in a power saving mode in case the apparatus is in the first state.

Furthermore, as an another example, a third group including at least one electrical entity and/or at least one functionality of apparatus may be defined, wherein the at least one electrical entity and/or at least one functionality of the third group is only set in power saving mode in case both the apparatus is in the second state as well as the second control signal on control signal line indicates that the voltage level is less then the predefined voltage. In this case, for instance, even important entities or functionalities may be set in the power saving mode.

Thus, different hierarchy levels for power saving modes may be defined, wherein each hierarchy level is associated with a group of at least one electrical entity and/or the at least one functionality of the apparatus, and wherein each hierarchy level may be associated with a predefined logical combination of at least the state of the apparatus, i.e., whether the apparatus is in the first or second state, and of the status of the second control signal. Thus, if a predefined logical combination associated with a hierarchy level is fulfilled, the respective at least one electrical entity and/or the at least one functionality of the group associated with this hierarchy level is set in power saving mode.

According to an exemplary embodiment of an aspect of the invention, the apparatus represent a mobile apparatus.

According to an exemplary embodiment of an aspect of the invention, the apparatus forms part of a Third Generation Partnership Project.

According to an exemplary embodiment of an aspect of the invention, the apparatus comprises a controller which is configured to monitor at least one rule regarding the energy management of the apparatus, wherein in accordance with a fulfilled rule of the at least one rule the controller controls the balancing element to control or regulate an energy flow between at least two of:

the first rechargeable energy source (and/or power supply line),
the second rechargeable energy source, and,
optionally, the at least one electrical entity connected to the second power supply line, and,
optionally, at least one charger in accordance with the respective rule.

For instance, the at least one rule may comprise any one of the above-mentioned rules.

If one of the at least one rule is fulfilled, the controller may be configured to initiate a predefined energy flow in accordance with the respective rule by means of controlling the balancing element.

For instance, the controller may be configured to monitor different relevant voltages of the apparatus and/or currents floating in the apparatus and may apply a respective rules of the first switching rule in order to switch the apparatus from the first into the second state and may apply rules of the second switching rules in order to switch the apparatus from the second state into the first state or into another well-suited state (e.g., a third state or a fourth state). For instance, said rules may consider specific rules associated with the first energy source and/or the second energy source, e.g. its capacity, its State of Charge (SoC), its voltage, and so on, wherein the controller may be configured to switch the balancing element in the first state or in the second state in order to support an optimized point of operation of the apparatus.

For instance, the at least one charger may represent an internal charger of apparatus or may represent an external charger, wherein apparatus is be configured to be connected to the external charger, e.g., apparatus may comprise a charger interface being configured to connect to said external charger, wherein the internal charger or the charger interface is connected to the balancing element such that the balancing element may regulate or control energy flow from the charger to at least one of the first rechargeable energy source, the power supply line, the second rechargeable energy source, and, optionally, the at least one electrical entity connected to the second power supply line in accordance with a rule of the at least one rule. For instance, this rule may define that the balancing element regulates or controls the above mentioned energy flow from the charger if a voltage detected at the charger (or the charger interface) exceeds a predefined voltage threshold and/or if the current provided from the charger exceeds a predefined current threshold. As non-limiting example, this predefine voltage threshold may represent 5.5V, 6V, 6.5V or another other well-suited threshold, and the predefined current threshold may represent 0.8 A, 1 A, 1.2 A or any other well-suited threshold. Thus, for instance, if said charger is detected by the controller, the balancing element may be switched in a state for providing drawing energy from the charger to at least one of the first rechargeable energy source, the power supply line, the second rechargeable energy source, and, optionally, the at least one electrical entity connected to the second power supply line via the balancing element. As a non-limiting example, the balancing element may be configured to draw energy from the charger and to apply approximately 2 W or a maximum of 2 W or at least 2 W energy to the first rechargeable energy source, and/or to apply approximately 2 W or a maximum of 2 W or at least 2 W energy to the second rechargeable energy source, and/or approximately 1 W or a maximum of 1 W or at least 1 W energy to electrical entities connected to the second power supply line and or to the power supply line.

Furthermore, as an example, the controller may be part of the balancing element, and as another example, the controller may represent a different entity compared to the balancing element.

According to an exemplary embodiment of a further aspect of the invention, a system is disclosed, the system comprising: an apparatus according to one of the aspects mentioned above and comprising a first rechargeable energy source connected to the power supply connector of the apparatus.

According to an exemplary embodiment of another further aspect of the inventions, a power supply connector is disclosed, the power supply connector comprising a plurality of contacts configured to be connected to respective contacts of the first rechargeable battery, wherein at least two contacts of the plurality of contacts of the power connector are associated with ground and power, and wherein the first contact and the at least two contacts associated with ground and power of the power connector are arranged in a way that the first contacts loses contact with the respective contact of the first rechargeable energy source before one of the at least two contacts loses contact with the respective contact of the first rechargeable energy source when the rechargeable energy source is removed from the power connector.

Other features of all aspects of the invention will be apparent from and elucidated with reference to the detailed description of embodiments of the invention presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

DETAILED DESCRIPTION OF EMBODIMENTS OF THE INVENTION

Figure 1A:
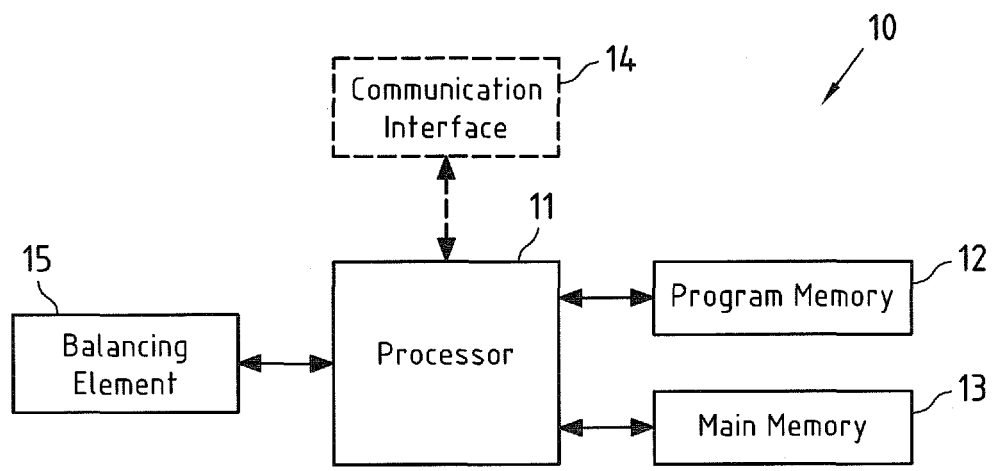
FIG. 1a: A schematic illustration of a first example embodiment of an apparatus according to an aspect of the invention.

FIG. 1a schematically illustrates components of a first example embodiment of an apparatus 10 according to a first aspect of the invention. Apparatus 10 may for instance be an electronic device that is for instance connectable to a removable first power supply (not depicted in FIG. 1a), e.g. a battery, via a power connector, wherein power may be fed from the connected first rechargeable energy source via the power connector and a power supply line of the apparatus (not depicted in FIG. 1a). For instance, the removable first power supply may be configured to be used by a mobile device. Apparatus 10 may for instance be embodied as a module. Furthermore, apparatus 10 may comprise a second rechargeable energy source (not depicted in FIG. 1a) and a balancing element 15.

Apparatus 10 may for instance be configured to operate in a first state, wherein in the first state power is provided from the power supply line to the second rechargeable energy source of the apparatus 10 via the balancing element 15 and wherein in the first state the second rechargeable energy source is decoupled from the power supply line balancing element such that power supply from the second rechargeable energy source to the power supply line is prevented.

Furthermore, apparatus 10 may for instance be configured to operate in a second state, wherein in the second state power is provided from the second rechargeable energy source to the power supply line.

Apparatus 10 may comprise a processor 11, which may for instance be embodied as a microprocessor, Digital Signal Processor (DSP) or Application Specific Integrated Circuit (ASIC), to name but a few non-limiting examples. Processor 11 may be configured to execute a program code stored in program memory 12 (for instance program code implementing one or more of the embodiments of a method according to the invention described below with reference to FIGS. 2b, 5 and 7), and interfaces with a main memory 13. Some or all of memories 12 and 13 may also be included into processor 11. Memories 12 and/or 13 may for instance be embodied as Read-Only Memory (ROM), Random Access Memory (RAM), to name but a few non-limiting examples. One of or both of memories 12 and 13 may be fixedly connected to processor 11 or removable from processor 11, for instance in the form of a memory card or stick.

Processor 11 may further control an optional communication interface 14 configured to receive and/or output information. This communication may for instance be based on a wire-bound or wireless connection. Optional communication interface 14 may thus for instance comprise circuitry such as modulators, filters, mixers, switches and/or one or more antennas to allow transmission and/or reception of signals.

Figure 1B:
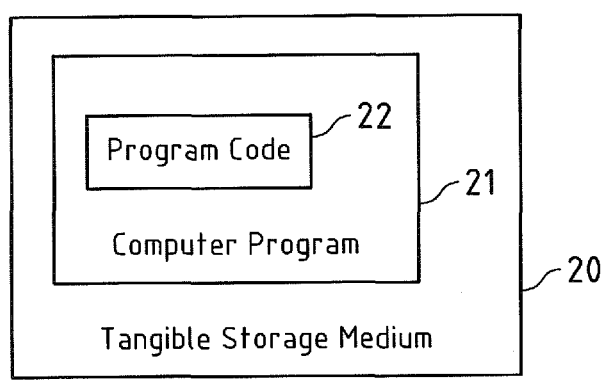
FIG. 1b: a tangible storage medium according to an embodiment of the invention.

FIG. 1b is a schematic illustration of an embodiment of a tangible storage medium 20 according to the invention. This tangible storage medium 20, which may in particular be a non-transitory storage medium, comprises a program 21, which in turn comprises program code 22 (for instance a set of instructions). Realizations of tangible storage medium 20 may for instance be program memory 12 of FIG. 1a. Consequently, program code 22 may for instance implement the flowcharts of FIGS. 2b, 5 and 7 discussed below.

Figure 2A:
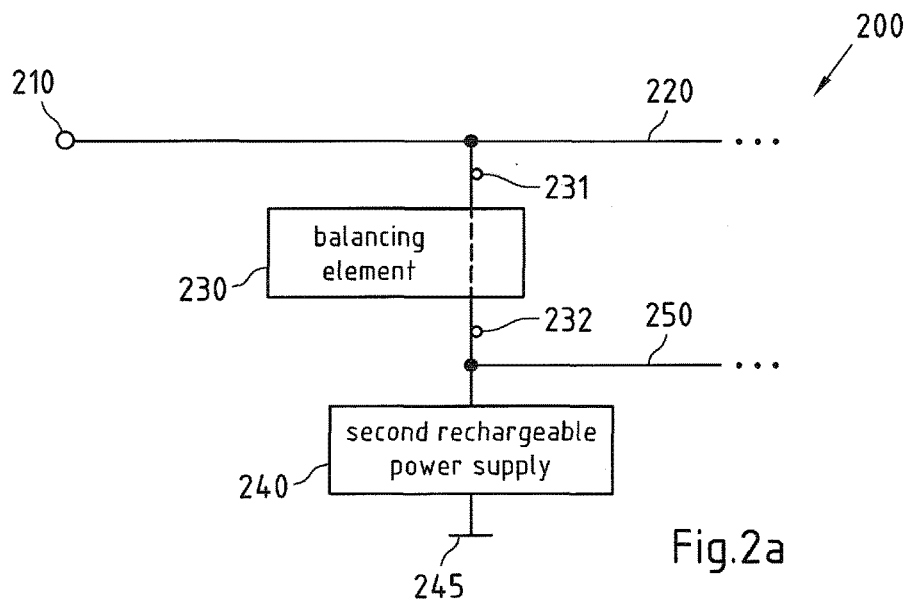
FIG. 2a: a second example embodiment of an apparatus according to an aspect of the invention.

FIG. 2a depicts a second example embodiment of an apparatus 200 according to an aspect of the invention. This second example embodiment of an apparatus will be explained in conjunction with the flowchart 200' of a first example embodiment of a method 200' according to an aspect of the invention shown in FIG. 2b. The steps of this flowchart 200' may for instance be defined by respective program code 22 of a computer program 21 that is stored on a tangible storage medium 20, as shown in FIG. 1b. Tangible storage medium 20 may for instance embody program memory 11 of FIG. 1a, and the computer program 31 may then be executed by processor 10 of FIG. 1a. Thus, the method 200' may be performed by apparatus 10 or by apparatus 200.

Apparatus 200 shown in FIG. 2a comprises a power connector 210 configured to be connected to a removable first rechargeable energy source (not depicted in FIG. 2a) and configured to supply power from the first rechargeable energy source to the apparatus 200 via a power supply line 220. For instance, the power connector 210 may represent a receptacle configured to receive the first rechargeable energy source. The power connector 210 may comprise a plurality of contacts (not depicted in FIG. 2a), wherein contacts of the plurality of contacts are configured to be electrically connected to respective contacts of the first rechargeable energy source when the first rechargeable energy source is connected to the power connector 210.

The first rechargeable energy source may represent any rechargeable energy source which is configured to store electrical energy and to supply this stored electrical energy. For instance, the first rechargeable energy source may represent a rechargeable battery, e.g. a lithium ion battery or a nickel metal hybrid battery or any other type of well-suited rechargeable battery, in particular any kinds of chemical rechargeable batteries, or it may represent any other kind of rechargeable energy source not representing a battery, e.g. a capacitor or electric coil or a fuel cell or the like.

Furthermore, apparatus 200 comprises a second rechargeable energy source 240 and a balancing element 230. The balancing element 230 is configured to provide power from the power supply line 220 to the second rechargeable energy source in a first state of the apparatus 200 and is configured to provide power from the second rechargeable energy source 240 to the power supply line 220 in a second state of the apparatus.

Furthermore, in the first state the apparatus 200 is configured to decouple the second rechargeable energy source 240 from the power supply line such that supplying power from the second rechargeable energy source 240 to the power supply line 220 is prevented.

Thus, in the first state of the apparatus 200 the second rechargeable energy source 240 may be charged via the balancing element by power provided from the first rechargeable energy source if the first rechargeable energy source is connected to power connector 210.

The second rechargeable energy source 240 may represent any rechargeable energy source which is configured to store electrical energy and to supply this stored electrical energy. For instance, the second rechargeable energy source 240 may represent a rechargeable battery, e.g. a lithium ion battery or a nickel metal hybrid battery or any other type of well-suited rechargeable battery, in particular any kinds of chemical rechargeable batteries, or it may represent another type of electrical energy storage 240' representing no battery, e.g. at least one capacitor 241, as exemplarily depicted in FIG. 2c. In case the second rechargeable energy source 240 comprises two or more capacitors 241, at least two capacitors may be connected in parallel and/or connected in series. For instance, the capacitance of the at least one capacitor may be in a range between 50 mF and 4 F, e.g. between 100 mF and 1 F, or between 1 F and 2 F, or between 2 F and 3 F, or between 3 F and 4 F, e.g. approximately or exactly 100 mF, 200 mF, 300 mF, 400 mF, 500 mF, 600 mF, 700 mF, 800 mF, 900 mF, 1000 mF, 2000 mF, 2500 mF, 3000 mF, 3500 mF, 4000 mF, but, as another example, the capacitance may have other values being different from the above mentioned ranges. Reference sign 245 indicates a ground contact.

For instance, the electrical storage capacity of the first rechargeable energy source may be much higher than the electrical storage capacity of the second rechargeable energy source. As an example, the storage capacity of the first rechargeable energy source may be at least ten times higher than the electrical storage capacity of the second rechargeable energy source, e.g. at least 100 times higher, e.g. at least 500 times higher, e.g. at least 1000 times higher.

Figure 2B:
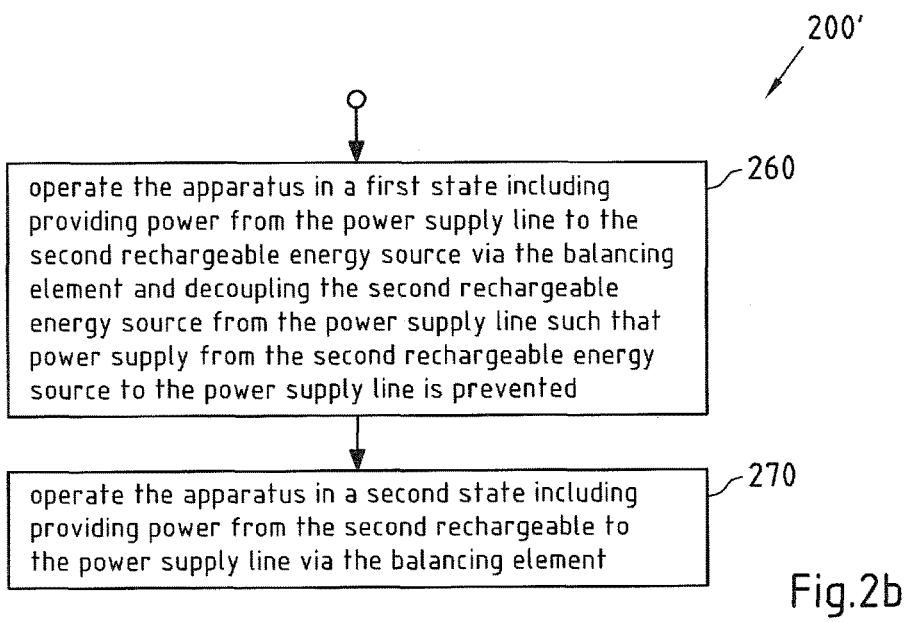
FIG. 2b; a flowchart of a first example embodiment of a method according to an aspect of the invention.
Figure 2C:
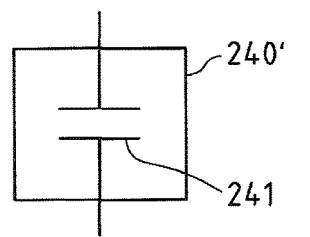
FIG. 2c: an example embodiment of a second rechargeable energy source.

Accordingly, the apparatus 200 can be operated in the first state, as indicated by step 260 in FIG. 2b, including charging the second rechargeable energy source 240 by power provided from the first rechargeable energy source while simultaneously decoupling the second rechargeable energy source from the power supply line 220 such that supplying power from the second rechargeable energy source 240 to the power supply line 220 is prevented.

In the first state, the apparatus 200 may charge the second rechargeable energy source 240 by power supplied from the first rechargeable energy source. For instance, this charging may be performed without any supplement from an external non-rechargeable energy source connected to apparatus, e.g. a power supply being connected to an electric supply network or another apparatus providing electrical energy. Thus, for instance, only energy provided from the first rechargeable energy source may be used for charging the second rechargeable energy source 240. For instance, it has to be understood that charging may also include keeping the energy of the second rechargeable energy source 240 at an approximately constant level when an energy level of the second rechargeable energy source 240 has reached a predefined level.

Thus, in the first state, energy of the first rechargeable energy source 240 may be used to charge the second rechargeable energy source 240 and maintain energy in the second rechargeable energy source 240. For instance, this charging may be performed by means of the balancing element 230.

For instance, in the first state the balancing element 230 may be assumed to represent an element which fixes one electrical input quantity provided at the input 231 of the balancing element and varies the corresponding electrical output quantity provided at the output 232 of the balancing element 230 or which fixes one electrical output quantity provided at output 232 to a predefined value and varies the corresponding electrical input quantity provided at input 231. As an example, the electrical quantity may represent one of voltage or current. For instance, in this example the fixed electrical input quantity may represent the voltage of the power supply line 220, which represents the input voltage of the balancing element 230 in the first state, wherein the output voltage of the balancing element 230 may represent the corresponding variable output quantity. Thus, the electric output quantity provided at the output 232 may be balanced with respect to the fixed electric input quantity at the input 231 in the first state. Accordingly, for instance, the balancing element 230 may be assumed to decouple an electrical input quantity from the corresponding electrical output quantity.

Furthermore, as an optional example, in the second state the balancing element 230 may be configured to be operated in an opposite direction compared to the first state, i.e., the input of balancing element 230 may be represented by reference sign 232 depicted in FIG. 2a, wherein the output of balancing element 230 may be represented by reference sign 213 depicted in FIG. 2a, and wherein in the second state the balancing element 230 may be assumed to represent an element which fixes one electrical input quantity provided at the input 232 of the balancing element and varies the corresponding electrical output quantity provided at the output 231 of the balancing element 230 or which fixes one electrical output quantity provided at output 231 and varies the corresponding electrical input quantity provided at input 232, as explained with respect to the first state.

Furthermore, in the first state power from the first rechargeable energy source can be provided to the apparatus 200, e.g., to at least one electrical entity of the apparatus 200.

As an example, the second rechargeable energy source 240 may be connected to an optional second power supply line 250. For instance, this optional second power supply line 250 may be connected to at least one electrical entity of the apparatus (not depicted in FIG. 2a), wherein this at least one electrical entity may represent an electrical entity having a power consumption with power peaks, wherein the second rechargeable energy source 240 may act as a kind of energy buffer for providing sufficient energy to the at least one electrical entity even in the case that power peaks occurs. As an example, this at least one electrical entity connected to the optional second power supply line 250 may represent a power amplifier.

Furthermore, the apparatus 200 can be operated in the second state, as indicated by step 270 in FIG. 2b, i.e., the method 200' may include changing the status of the apparatus 200 from the first state to the second state.

In this second state, the balancing element 230 provides power from the second rechargeable energy source 240 to the power supply line 220 of the apparatus 200.

For instance, the apparatus 200 may switch into the second state in case it is detected that the removable first rechargeable energy source is removed from the power connector 210. Thus, as an example, power supply of at least one electrical entity connected to power supply line 220 may be performed by power provided from the second rechargeable energy source 240 in the second state and it is not necessary that the first rechargeable energy source is connected to the power connector 210 so long as there is enough energy stored in second rechargeable energy source 240.

Thus, the balancing element 230 may represent an element which is configured to decouple the second rechargeable energy source 240 from the power supply line 220 in at least one direction in the first state, i.e. the direction starting from the second rechargeable energy source 240 through the balancing element 230 towards the power supply line 220 in order to prevent supplying power from the second rechargeable energy source 240 to the power supply line 220 in the first state.

For instance, the second state may be used during a hot swap of the first rechargeable energy source.

As an example, when the first rechargeable energy source is nearly empty the first rechargeable energy source is to be removed from the power connector 210 and replaced with a fully charged power supply, which then represents the new first rechargeable energy source after being connected to the power connector 210. Due to the second state of the apparatus 200 power supply to the apparatus can still be provided through the power line 220 by means of power provided by the second rechargeable energy source 240. Thus, for instance, no shut down of the apparatus 100 is necessary even in case the first rechargeable energy source is replaced and, as an example, no reboot is necessary after the new first rechargeable energy source is connected to the power connector 210.

This may show the advantage that a start up of the system and fully reboot of the system, which may take a couple of minutes, dependent on the complexity and usage of the apparatus, e.g., a mobile terminal, can be avoided.

Furthermore, due to the charging of the rechargeable energy source 240 in the first state with energy provided from the first rechargeable energy source, it can be ensured that there is sufficient energy stored in the second rechargeable energy source even in case the apparatus represents a mobile apparatus which is not connected to an external power supply. As an example, this may allow maintaining an ongoing data download or a call via WLAN while swapping the first rechargeable energy source.

Accordingly, for instance, the use of the second rechargeable energy source 240 as an additional energy storage media allows for compensating power peaks and using it as an energy source in the case of first rechargeable energy source hot swap.

For instance, the power connector 210 may be placed near to the processor 11 of the apparatus 10, 200, and thus there may be only a short distance between the first rechargeable energy source and the processor 11, and the second rechargeable energy source 240 may for instance be placed near the at least one electrical entity being connected to the second power supply line 250. Thus, freedom of design may be achieved due to the usage of the second rechargeable energy source 240.

Figure 3A:
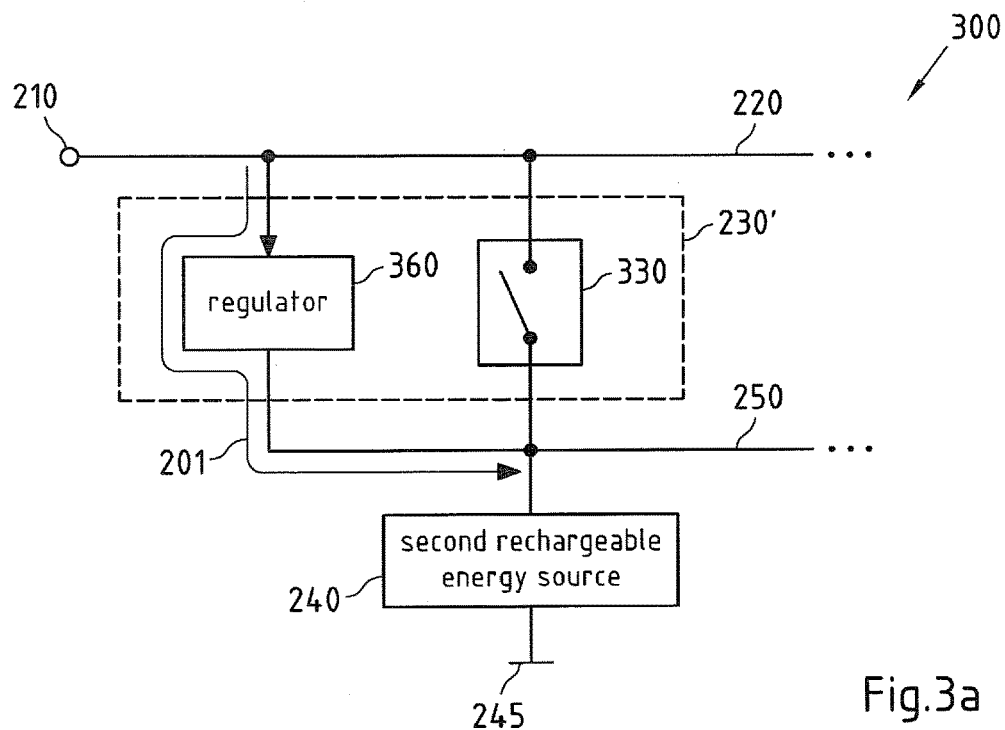
FIG. 3a: a third example embodiment of an apparatus according to an aspect of the invention in a first state.

FIG. 3a depicts a third example embodiment of an apparatus 300 according to an aspect of the invention. For instance, this apparatus 300 may be based on the apparatus 10 depicted in FIG. 1a or on the apparatus 200 depicted in FIG. 2a. Thus, the explanations presented above with respect to the apparatuses 11 and 200 and presented with respect to any presented also hold for the third example embodiment of an apparatus 300 depicted in FIG. 3a.

In this third example embodiment of an apparatus 300 the balancing element 230' comprises a switch 330 and a regulator 306, wherein the switch 330 is configured to be open in the first state of the apparatus, i.e., no power can be provided from the second rechargeable energy source 240 through the balancing element 300 to the power supply line 330 in the first state. Furthermore, in the second state the switch 330 is configured to be closed. For instance, the balancing element 330 may comprise a control input configured to receive a control signal for switching the balancing element in accordance with the first or second state, wherein the control signal is indicative of the state of the apparatus 300.

As an example, the switch 330 may represent a transistor, e.g. a field-effect transistor (FET), or a mechanical switch, e.g. a relais, like a mico-mechanical switch or any other well-suited switch, e.g. a high power controllable switch.

Furthermore, the regulator 360 may is configured to charge the second rechargeable energy source 240 with power received from the power supply line 220. For instance, this regulator 360 may represent a unidirectional regulator which is configured to provide power from the power supply line 220 to the second rechargeable energy source 240 but which is not capable of providing power in the other direction, i.e., from the second rechargeable energy source 240 to the power supply line 220.

For instance, the regulator 360 of the balancing element 230' may be configured to regulate the voltage provided at the power supply line 220 down to a predefined voltage level in order to charge the second rechargeable energy source 240 with this predefined voltage level, and/or, the regulator may be configured to regulate the voltage provided at the power supply line 220 up to a predefined voltage level in order to charge the second rechargeable energy source 240 with this predefined voltage level. For instance, the predefined voltage level may be the same for both scenarios. Thus, the regulator 360 may regulate the voltage down to the predefined voltage level in case the voltage of the power supply line 220 is higher than the predefined voltage level, and the regulator 360 may regulate the voltage up to the predefined voltage level in case the voltage of the power supply line 220 is lower than the predefined voltage level. Thus, as an example, the regulator may represent a Switch Mode Power Supply (SMPS) which may operate as a Buck SMPS for regulating the voltage down and/or as Boost SMPS for regulating the voltage up.

FIG. 3a depicts apparatus 300 in the first state, i.e., power is provided from the power supply line 220 to the second rechargeable energy source 240 via the regulator 360 of the balancing element 230', as indicated by arrow 201, wherein the apparatus 300' simultaneously prevents that power is supplied from the second rechargeable energy source 240 to the power supply line 220 by means of opened switch 330.

For instance, in case the first rechargeable energy source represents a battery, the voltage of this battery may be in the range from 2.5V to 4.4V, and the regulator 360 may be configured to charge at a predefined voltage, which may for instance be 3.0V or any other well suited predefined voltage in accordance with the second rechargeable energy source 240.

Furthermore, as an example, the regulator 360 may have a specific balancer option in case that the second rechargeable energy source 240 comprises at least two capacitors placed in series.

Figure 3B:
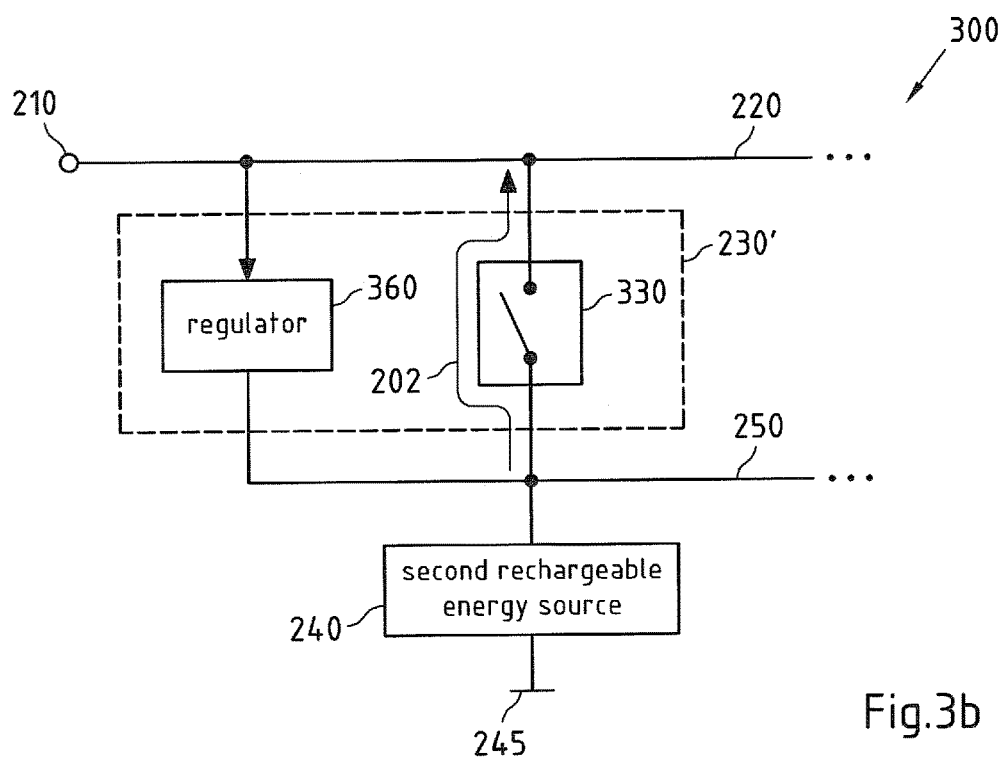
FIG. 3b: the third example embodiment of an apparatus according to an aspect of the invention in a second state.

FIG. 3b depicts apparatus 300 in the second state, i.e., power is provided from the second rechargeable energy source 240 to the power supply line 220 via the closed switch 330 of the balancing element 230', as indicated by arrow 202.

Figure 3C:
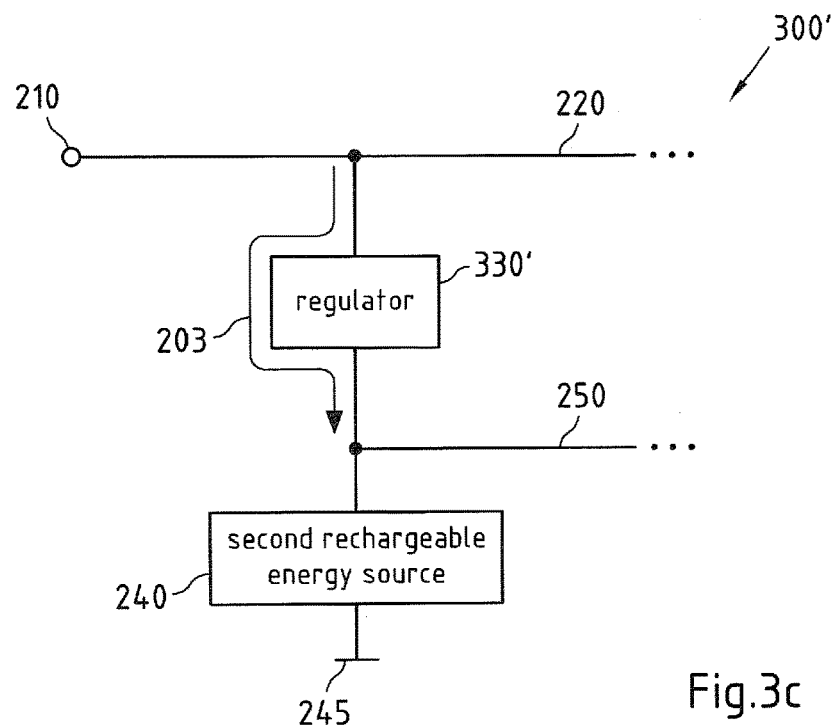
FIG. 3c: a fourth example embodiment of an apparatus according to an aspect of the invention in a first state.

FIG. 3c depicts a fourth example embodiment of an apparatus 300' according to an aspect of the invention, wherein apparatus 300' is operated in the first state. For instance, this apparatus 300' may be based on the apparatus 10 depicted in FIG. 1a or on the apparatus 200 depicted in FIG. 2a. Thus, the explanations presented above with respect to the apparatuses 11 and 200 and presented with respect to any presented also hold for the fourth example embodiment of an apparatus 300 depicted in FIG. 3a.

Figure 3D:
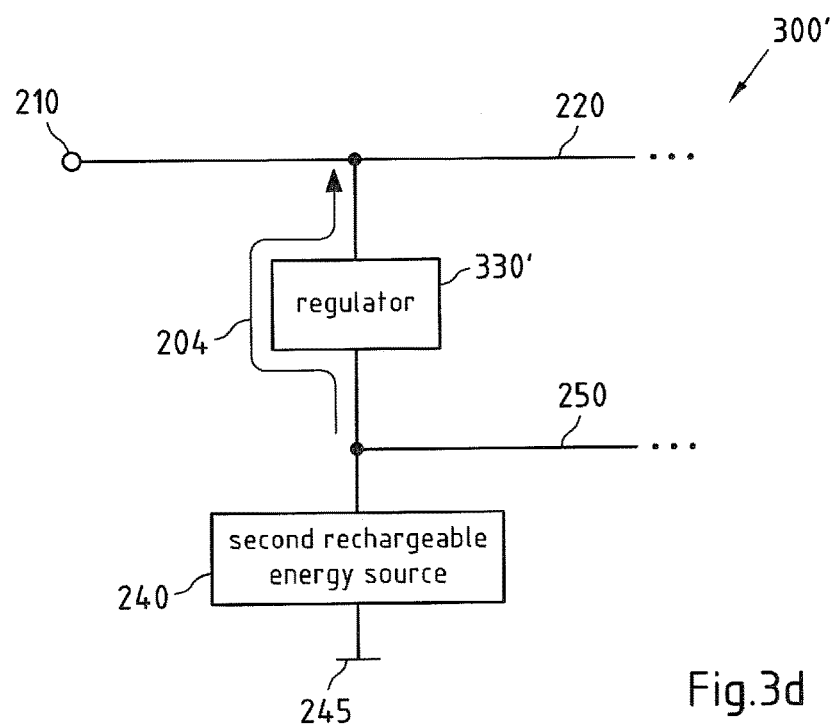
FIG. 3d: the fourth example embodiment of an apparatus according to an aspect of the invention in a second state.

In this apparatus 300' the balancing element 330' comprises a regulator 330', wherein the regulator 330' may represent a bidirectional regulator which is configured to provide power from the power supply line 220 to the second rechargeable energy source 240 in the first state, as depicted by arrow 203 in FIG. 3d, thereby preventing that power is supplied form the second rechargeable energy source 240 to power supply line 220 in the first state of the apparatus. Thus, the second rechargeable energy source 240 can be charged by means of the regulator 330' in the first state, wherein in the first state the regulator 330' can only provide power in the direction starting from the power supply line 220 to the second rechargeable energy source 240. The charging may be performed as described with respect to the regulator 330 depicted in FIG. 3a. For instance, any explanations regarding the charging functionalities of the regulator 330 may also hold for the charging functionalities of the regulator 330' when the apparatus is in the first state.

Furthermore, in the second state of the apparatus the regulator 330' may be configured to change the direction of providing power such that power can be provided from the second rechargeable energy source 240 to the power supply line 220 in the second state via the regulator 330', as depicted in FIG. 3d by arrow 204. Accordingly, the regulator/balancing element 330' may be considered to represent a switchable bidirectional regulator 330'.

As an example, in the second state the switchable bidirectional regulator 330' might be configured to charge the first rechargeable energy source, if already connected to the power connector 210, by power provided from the second rechargeable energy source 240.

For instance, the regulator/balancing element 330' may comprise a control input configured to receive a control signal for switching the regulator/balancing element in accordance with the first or second state, wherein the control signal is indicative of the state of the apparatus 300'.

For instance, the balancing element 230 depicted in FIG. 2a may be realized by the bidirectional regulator 330' depicted in FIGS. 3c and 3d, where in the first state the regulator 330' may be assumed to represent the above-mentioned element which fixes one electrical input quantity provided at the input 231 of the balancing element 230 and varies the corresponding electrical output quantity provided at the output 232 of the balancing element 230 or which fixes one electrical output quantity provided at output 232 and varies the corresponding electrical input quantity provided at input 231, and wherein in the second state the regulator 330' may be assumed to be configured to be operated in an opposite direction compared to the first state, i.e., as mentioned with respect to one example of the balancing element 230 of FIG. 2a.

Figure 4:
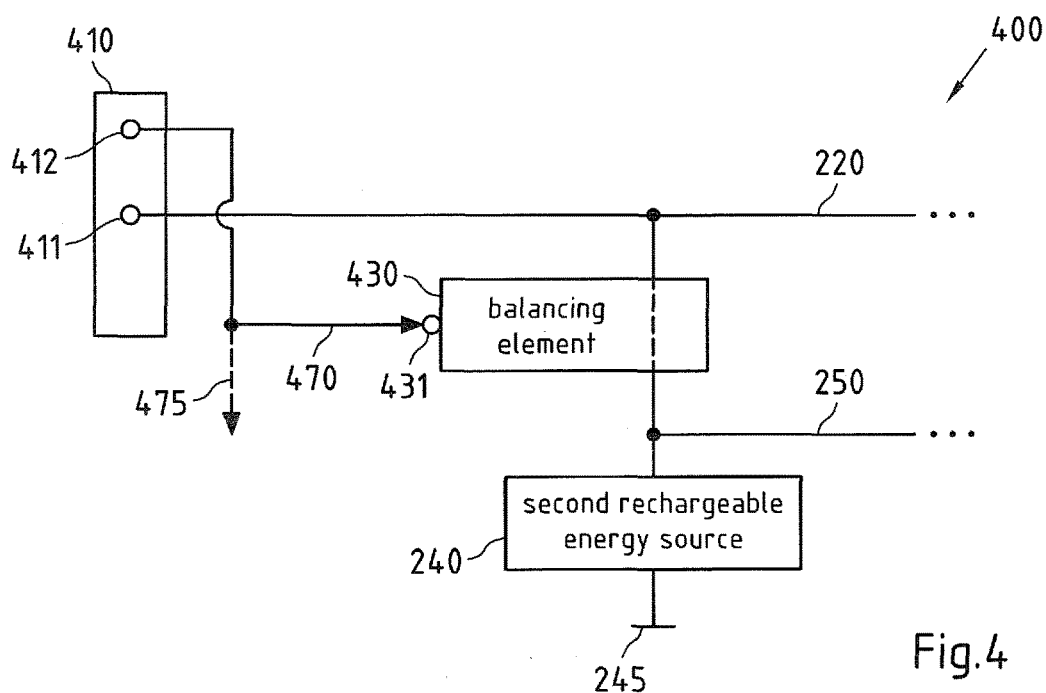
FIG. 4: a fifth example embodiment of an apparatus according to an aspect of the invention.

FIG. 4 depicts a fifth example embodiment of an apparatus 400 according to an aspect of the invention. For instance, this apparatus 400 may be based on the apparatus 10 depicted in FIG. 1a or on any of the apparatus 200, 300, 300' depicted in FIGS. 2a, 3a, 3b, 3c and 3d. Thus, the explanations presented above with respect to the apparatuses 11 and 200, 300, 300' and presented with respect to any presented method also hold for the fifth example embodiment of an apparatus 400 depicted in FIG. 4. In particular, balancing element 430 depicted in FIG. 4 may represent the balancing element 15 depicted in FIG. 1a, or the balancing element 230 shown in FIG. 2a, or the balancing element 230' depicted in FIGS. 3a and 3b, or the balancing element 330' depicted in FIGS. 3c and 3d.

The balancing element 43 comprise a control input configured to receive a control signal for switching the regulator/balancing element in accordance with the first or second state of the apparatus 400, wherein the control signal is indicative of the state of the apparatus 300'.

The control signal is transmitted via a control signal line 470 of the apparatus.

For instance, the apparatus may comprise means for detecting whether the first rechargeable energy source is connected or removed from the power supply 210, 410, wherein this means for detecting whether the first rechargeable energy source is connected or removed from the power supply 210, 410 might be configured to output the control signal being indicative that the apparatus in the first state on the control signal line 470 if the first rechargeable energy source is connected to the power connector 210, 410 and the means for detecting whether the first rechargeable energy source is connected or removed from the power supply 210, 410 might be configured to output the control signal being indicative that the apparatus is in the second state on the control signal line 470 if the first rechargeable energy source is removed from the power connector 210, 410.

As an example, the means for detecting whether the first rechargeable energy source is connected or removed from the power supply 210, 410 might include an electro-mechanical sensor configured to sense whether the first rechargeable energy source is connected or removed from the power connector 210, 410, e.g. a switch.

As another example, the means for detecting whether the first rechargeable energy source is connected or removed from the power supply 210, 410 might determine whether the first rechargeable energy source is connected or removed from the power connector 210, 410 based on the electrical status of a contact 411, 412 of the power connector 410, as exemplarily depicted in FIG. 4.

For instance, this contact used for determining whether the first rechargeable energy source is connected or removed from the power connector 210, 410 may be denoted as first contact, wherein the signal of the control signal line 470 depends on the signal of this first contact 412 of the power connector 410. Thus, for instance, the control signal of control signal line 470 may indicate that the apparatus is in the first state if the respective contact of the first rechargeable energy source is connected to the first contact, and the control signal of control signal line 470 may indicate that the apparatus is in the second state if the respective contact of the first rechargeable energy source is disconnected from the first contact 412. For instance, the first contact may be configured to be connected to a respective identification contact of the first rechargeable energy source, e.g. battery size indicator or digital battery interface.

As an example, contact 411 of the power connector 410 may represent a power contact configured to receive power from the first rechargeable energy source, e.g., a VBAT contact, and contact 412 of the power connector 410 may represent a contact which is configured to be connected to an identification contact of the first rechargeable energy source. Furthermore, the power connector 410 may comprise at least one further contact not depicted in FIG. 4, e.g. a ground contact and/or a contact associated with an Integrated HandsFree (IHF) functionality. For instance, contact 411 may be used as the first contact mentioned above.

Figure 5:
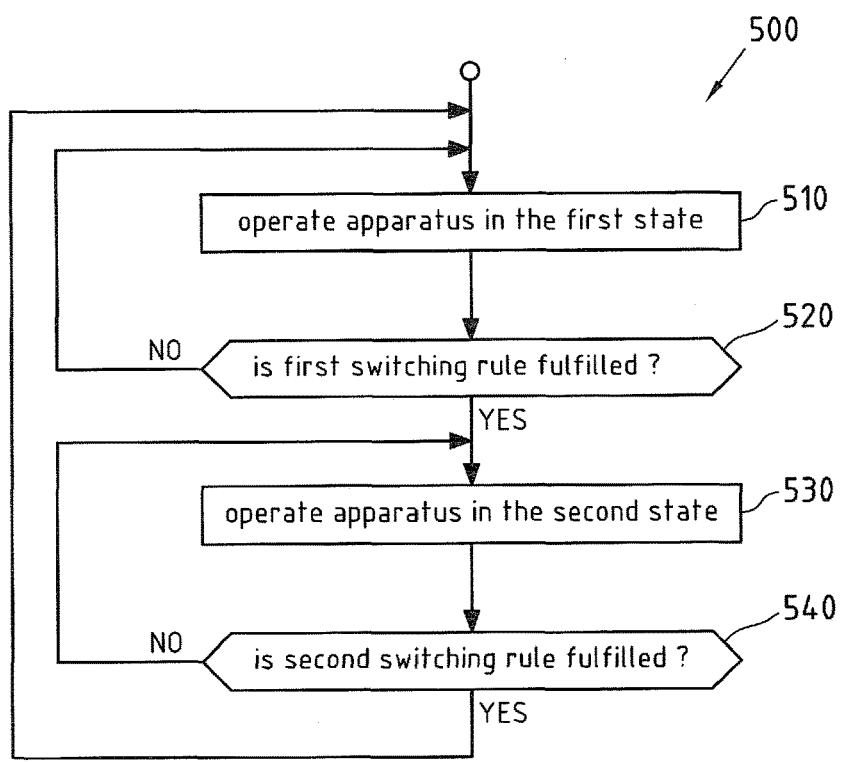
FIG. 5: a flowchart of a second example embodiment of a method according to an aspect of the invention.

FIG. 5 depicts a flowchart of a second example embodiment of a method 500 according to an aspect of the invention. The steps of this flowchart 500 may for instance be defined by respective program code 22 of a computer program 21 that is stored on a tangible storage medium 20, as shown in FIG. 1b. Tangible storage medium 20 may for instance embody program memory 11 of FIG. 1a, and the computer program 31 may then be executed by processor 10 of FIG. 1a. Thus, the method 500 may be performed by apparatus 10 or by any of the apparatuses 200, 300, 300' and 400.

The method 500 will now be explained in conjunction with apparatus 400 depicted in FIG. 4.

In a step 510 the apparatus 400 is operated in the first status. I.e., the second rechargeable energy source 240 is charged by power provided from the power supply line 220 via the balancing element 430 wherein the apparatus 400 prevents that power is supplied from the second rechargeable energy source 240 to the power supply line 220.

In a step 520 is checked whether a first switching rule is fulfilled, wherein the first switching rule comprises at least one rule associated with a switch of the apparatus from the first state into the second state.

As an example, the first switching rule may comprise a disconnect rule associated with a connecting status of the first rechargeable energy source with respect to the power connector 410. For instance, this disconnect rule may indicate that the status of apparatus 400 is to be changed from the first state into the second state when the first rechargeable energy source is disconnected from the power connector 410, wherein checking of this connecting rule may be performed based on the status of the control signal provided on control line 470. If the control signal provided on control line 470 indicates that the first rechargeable energy source is connected to the power connector 410, then, for example, in this case, the method proceeds in step 510 with maintain operating the apparatus 400 in the first state since the disconnect rule is not fulfilled.

Otherwise, for example, if the control signal provided on control line 470 indicates that the first rechargeable energy source is disconnected from the power connector 410 then it may be detected in step 520 that the disconnect rule is fulfilled and the method proceeds with operating the apparatus in the second state in step 530. Thus, in this second state power is provided from the second rechargeable energy source 240 to the power supply line 220 as described above.

Then, in a step 540 it may be checked whether a second switching rule fulfilled, wherein the second switching rule comprises at least one rule associated with a switch of the apparatus from the second state into the first state. As an example, in step 540 it may be checked whether a rule of the second switching rule being associated with the rule of the first switching rule that was fulfilled in previous step 520 is fulfilled.

With regard to the example mentioned above concerning the disconnect rule, this rule of the second switching rule being associated with the disconnect rule may represent a connect rule which indicates a switch from the second state to the first state when the first rechargeable energy source is connected to the power connector 410, wherein this checking may be performed based on the status of the control signal provided on control line 470. If the control signal provided on control line 470 indicates that the first rechargeable energy source is still disconnected from the power connector 410, then, in this case, the method proceeds in step 530 with maintaining operating the apparatus 400 in the second state since the connect rule is not fulfilled.

Otherwise, in this example, if the control signal provided on control line 470 indicates that the first rechargeable energy source is connected to the power connector 410, it is detected in step 540 that the connect rule is fulfilled and the method proceeds with operating the apparatus in the first state in step 510, as mentioned above.

Thus, as an example, the control signal on the control signal line 470, 475 may be assumed to be indicative of the status whether first rechargeable energy source is connected to the power connector 410 or nor.

Figure 6A:
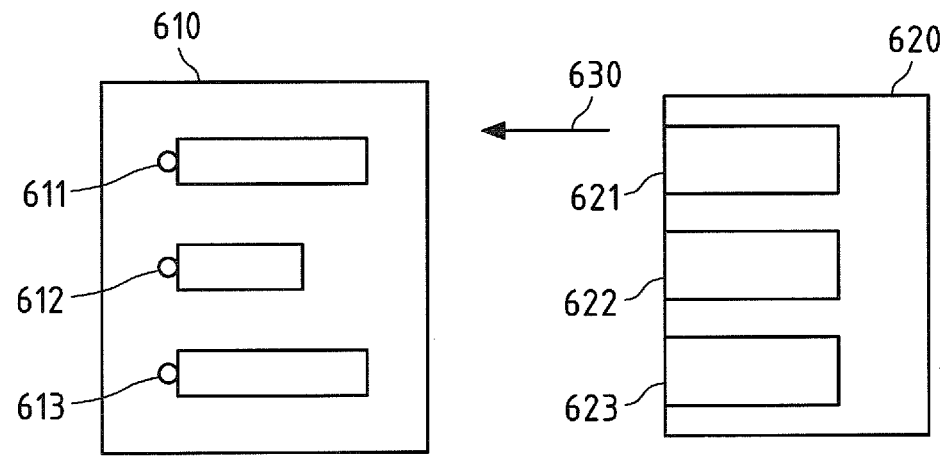
FIG. 6a: an example embodiment of a power connector according to an aspect of the invention in conjunction with an example of a removable first rechargeable energy source in a disconnected position.

FIG. 6a depicts an example embodiment of a power connector according to an aspect of the invention in conjunction with an example of a removable first rechargeable energy source in a disconnected position.

In this example the power connector 610 of the apparatus comprises a plurality of contacts 611, 612, 613, wherein the first contact represents contact 612 and wherein contact 611 may represent a power contact and contact 613 may represent a ground contact. It has to be understood that the power connector 610 may comprise further contacts not depicted in FIG. 6a.

Furthermore, FIG. 6a depicts an example of battery 620 which may represent any of the above mentioned removable first rechargeable power supplies, wherein the battery 620 comprises contacts 621, 622, 623, wherein each of these contacts electrically contacts with a respective contact of the power connector 610 when the battery 620 is connected to the power connector 610, as indicated by reference sing 630.

The first contact 612 and at least two contacts 611, 613 associated with ground and power of the power connector 610 are arranged in a way that the first contacts 612 loses contact with the respective contact 622 of the battery 621 before one of the at least two contacts 611, 613 loses contact with the respective contact 621, 623 of the battery when the rechargeable energy source is removed from the power connector. For instance, as exemplarily depicted in FIG. 6a, the length of the first contact 612 may be shorter compared to the length of the at least two contacts 612, 612. Thus, if the battery 620 is in a position where it is connected to the power connector 610, as exemplarily depicted in FIG. 6b, and then the battery 620 is removed from the power connector 610, as indicated by reference sign 630' in FIG. 6b, the first contact 612 loses contact with the respective contact 622 of the battery 620 before the at least two contacts 611, 613 of the power connector 610 lose contact with the respective contacts 621, 623 of the battery.

Accordingly, it can be indicated on the control signal line 470 that the battery 620 is removed shortly before the at least two contacts 611, 613 are disconnected from the battery and thus, there is enough time for the apparatus to switch from the first state to the second state before power supplied from the battery 620 is stopped due to disconnection of the at least two contacts 611, 613. Thus, it can be avoided that there is a interruption of power supply on the power supply line 220 when the battery 620 is removed from the power connector 610.

Vice versa, this enables that a new battery 620 can be fit to the power connector 610 in a way that first the at least two contacts 611, 613 get in contact with the respective contacts 621, 623 of the battery such that power can be provided on the power supply line 220 by the battery 230 before the apparatus switches from the second state to the first state based on the control signal generated from the electrical status of the first contact 612.

Figure 6B:
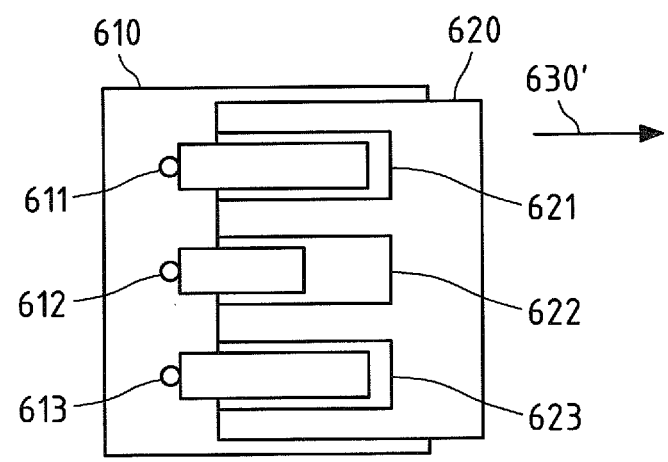
FIG. 6b: an example embodiment of a power connector according to an aspect of the invention in conjunction with an example of a removable first rechargeable energy source in a connected position.
Figure 6C:
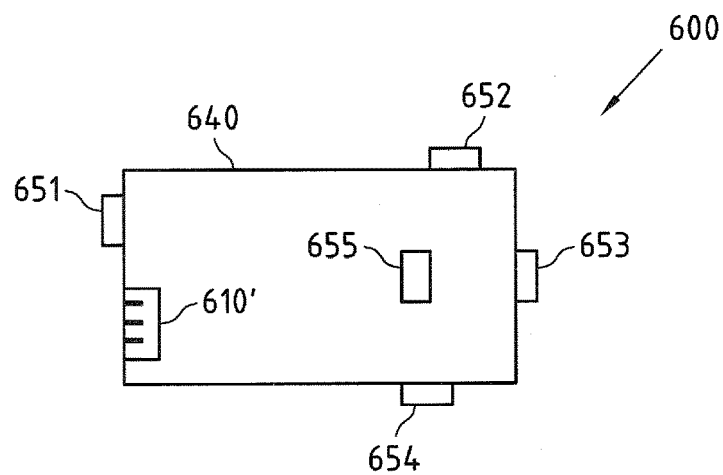
FIG. 6c: an example embodiment of a reception means for a removable rechargeable energy source according to an aspect of the invention.

FIG. 6c depicts an example embodiment of a reception means 600 configured to receive a removable rechargeable energy source (not depicted in FIG. 6c), wherein the removable rechargeable energy source may represent any of the above mentioned removable first rechargeable power supplies. For instance, said first rechargeable power supply may represent a battery. For instance, the reception means 600 may be part of any of the apparatuses mentioned above.

The reception means 600 comprises a power connector 610' which may represent the power connector 610 depicted in FIGS. 6a and 6b or may represent any other well-suited power connector, wherein the reception means 600 is configured to receive the removable rechargeable energy source, e.g. in a recess 640 or compartment 640, and wherein the power connector 610' comprises at least two contacts configured to contact to respective at least two contacts of the removable rechargeable energy source when the removable rechargeable energy source is placed in the reception means 600. Thus, for instance, the removable rechargeable energy source may provide power to the apparatus, e.g., via power supply line 220, when placed in the reception means 600, wherein a first contact of the at least two contacts of the power connector 610' may represent a ground contact and a second contact of the at least two contacts of the power connector 610' may represent a power contact which might for instance be connected with the power supply line 220.

The reception means 600 further comprises at least one sensor 651, 652, 653, 654, 655, wherein each of the at least one sensor 651, 652, 653, 654, 655 is configured to detect whether the rechargeable energy source is placed in the reception means 600 or whether the removable rechargeable energy source is removed from the reception means 600. The information provided by at least one sensor 651, 652, 653, 654, 655 of the at least one sensor 651, 652, 653, 654, 655 may be used for detecting whether the removable is removed from the reception means 600, wherein the apparatus might for instance be configured to be switched to the second state if one of the at least one sensor 651, 652, 653, 654, 655 indicates that the removable rechargeable energy is removed from the reception means 600. Furthermore, for instance, the apparatus might be configured to switch in the first state when each sensor of the at least one sensor 651, 652, 653, 654, 655 indicates that the removable rechargeable energy source is placed in the reception means 600.

For instance, at least one sensor of sensors 651, 652, 653, 654 may be placed at an inside of a sidewall or a side-surface of the recess 640 or compartment 640, and/or, sensor 655 may be placed at the bottom of the recess 640 or compartment 640 such that sensor 655 is located underneath the removable rechargeable energy source when the removable rechargeable energy source is placed in the reception means 600.

Furthermore, for instance, the power connector 610' and at least one sensor 651, 652, 653, 654, 655 of the at least one sensor 651, 652, 653, 654, 655 might be arranged in a way that the at least one sensor 651, 652, 653, 654, 655 of the at least one sensor 651, 652, 653, 654, 655 is configured to detect a removal of the removable rechargeable energy source from the reception means 600 before at least one contact of the contacts of the power connector 610 loses contact with the respective at least one contact of the removable rechargeable energy source when the rechargeable energy source is removed from the reception means 600.

Thus, for instance, if the removable rechargeable energy source is placed in a position in the reception means 600 where it is connected to the power connector 610', and afterwards the removable rechargeable energy source is removed from the reception means 600, the at least one sensor 651, 652, 653, 654, 655 of the at least one sensor 651, 652, 653, 654, 655 indicates the removal of the removable rechargeable energy source before the ground contact and the power contact of the power connector 610' lose contact to the respective contacts of the removable rechargeable energy source, and thus, based on the information provided by the at least one sensor 651, 652, 653, 654, 655 of the at least one sensor 651, 652, 653, 654, 655 it may be indicated to the apparatus, e.g. by means of control signal line 470, that the removable rechargeable energy source is removed shortly before the at least two contacts of the power connector 610' are disconnected from the removable rechargeable energy source and thus, for instance, there is enough time for the apparatus to switch from the first state to the second state before power supplied from the battery 620 is stopped due to disconnection of the at least two contacts of the power connector 610'. Thus, it may be avoided that there is a interruption of power supply on the power supply line 220 when the battery 620 is removed from the power connector 610.

Vice versa, as an example, this enables that a new removable rechargeable energy source can be placed in the reception means 600 and can be connected to the power connector 610' in a way that first the at least two contacts of power connector 610' connect to the removable rechargeable energy source before the at least one sensor 651, 652, 653, 654, 655 of the at least one sensor 651, 652, 653, 654, 655 indicates the placement of the removable rechargeable energy source in the reception means 600 and thus before the apparatus switches from the second state to the first state based on the information provided by the at least one sensor 651, 652, 653, 654, 655 of the at least one sensor 651, 652, 653, 654, 655.

Figure 6D:
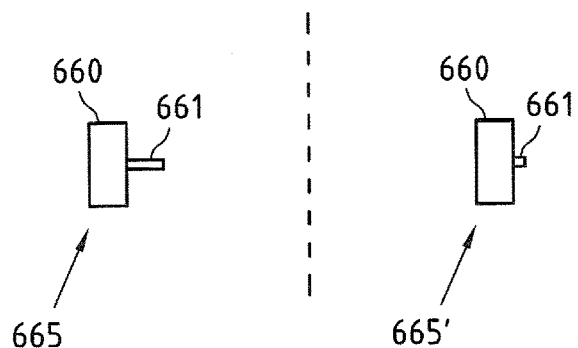
FIG. 6d: an example embodiment of a switch for the reception means.

FIG. 6d depicts an example embodiment of a switch 660 for the reception means 600 which might be used as at least one sensor 651, 652, 653, 654, 655 of the at least one sensor 651, 652, 653, 654, 655. For instance, this switch 660 represents an electromechanical switch which comprises a movable element 661, wherein in a first position 665 the movable element 661 is in a released position in which the electromechanical switch 660 indicates that no removable rechargeable energy source is placed in the reception means 600, and wherein the movable element 661 can be pressed or moved into a contact position, as exemplarily indicated by reference sign 665', and wherein in this contact position the electromechanical switch 660 indicates that a removable rechargeable energy source is placed in the reception means 600. For instance, the electromechanical switch 600 can be placed in any of the positions of sensors 651, 652, 653, 654, 655 depicted in FIG. 6c or at any other well-suited position at the inside of the compartment 640 or recess 640 in which the electromechanical switch 660 is configured to detect whether a removable rechargeable energy source is placed in the reception means 600 or not. Furthermore, the movable element 661 is arranged in a way that it is in contact position indicated by reference sign 665' when the removable rechargeable energy source is placed in the reception means 600, and the movable element 661 is arranged in a way that it is in release position indicated by reference sign 665 when the removable rechargeable energy source is removed from the reception means 600, wherein the movable element 661 is arranged in a way that during removing the removable rechargeable energy source from the reception means 600 the movable element 661 moves from the contact position 665' to the release position 665 before the at least two contacts of the power connector 610' are disconnected from the removable rechargeable energy source. For instance, this electromechanical switch 660 may represent a micro switch.

It has to be understood, that any other well-suited switch 660 than the described electromechanical switch might be used as sensor 651, 652, 653, 654, 655 which is configured to detect whether a removable rechargeable energy source is placed in the reception means 600 or not.

Figure 6E:
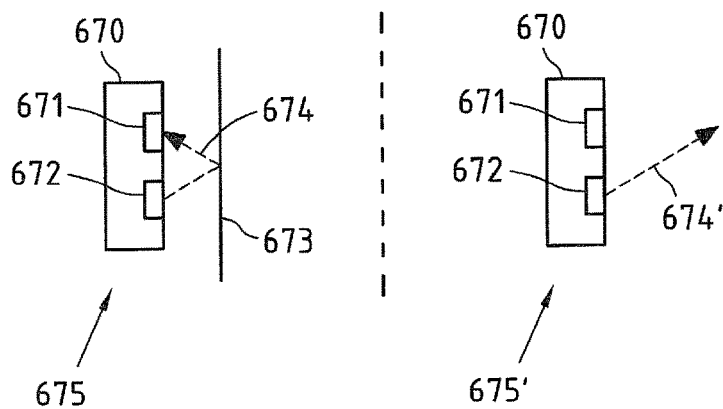
FIG. 6e: an example embodiment of an infrared sensor for the reception means.

FIG. 6e depicts an example embodiment of an infrared sensor 670 for the reception means 600 which might be used as at least one sensor 651, 652, 653, 654, 655 of the at least one sensor 651, 652, 653, 654, 655.

The infrared sensor 670 might comprise an infrared transmitter 672 and an infrared receiver 671, wherein the infrared sensor 670 is configured to output a detection signal if the infrared receiver 671 receives an infrared signal 674. For instance, the infrared sensor 670 might output this detection signal if the received infrared signal exceeds a predefined threshold.

For instance, the infrared sensor 670 can be placed in any of the positions of sensors 651, 652, 653, 654, 655 depicted in FIG. 6c or at any other well-suited position at the inside of the compartment 640 or recess 640 in which the infrared sensor 670 is configured to detect whether a removable rechargeable energy source is placed in the reception means 600 or not.

The infrared sensor 670 is arranged in a way that the infrared receiver 671 receives an infrared signal 674 emitted from the infrared transmitted and reflected by the removable rechargeable energy source when the removable rechargeable energy source is placed in the reception means 600, wherein this reflection might occur at a side wall 673 of the removable rechargeable energy source as exemplarily depicted by reference sign 675 in FIG. 6e. Accordingly, as an example, the infrared sensor 670 is configured to indicate that the removable rechargeable energy source is placed in the reception means 600 when the infrared receiver 671 receives an infrared signal 674, as mentioned above.

Furthermore, for instance, if the removable rechargeable energy source is removed from the reception means 600, the infrared signal emitted from the infrared transmitter 672 is not reflected and the infrared receiver 671 does not receive an infrared signal (or only a very weak infrared signal). Thus, in this scenario, as exemplarily shown by reference sign 675' in FIG. 6e, the infrared sensor 670 is configured to indicate that the removable rechargeable energy source removed from the reception means 600 since the infrared receiver 671 receives no infrared signal 674 or only a weak infrared signal, as mentioned above.

Furthermore, the infrared sensor 670 is arranged in a way that during removing the removable rechargeable energy source from the reception means 600 the infrared sensor 670 first indicates that the removable rechargeable energy source is removed before the at least two contacts of the power connector 610' are disconnected from the removable rechargeable energy source.

Figure 7:
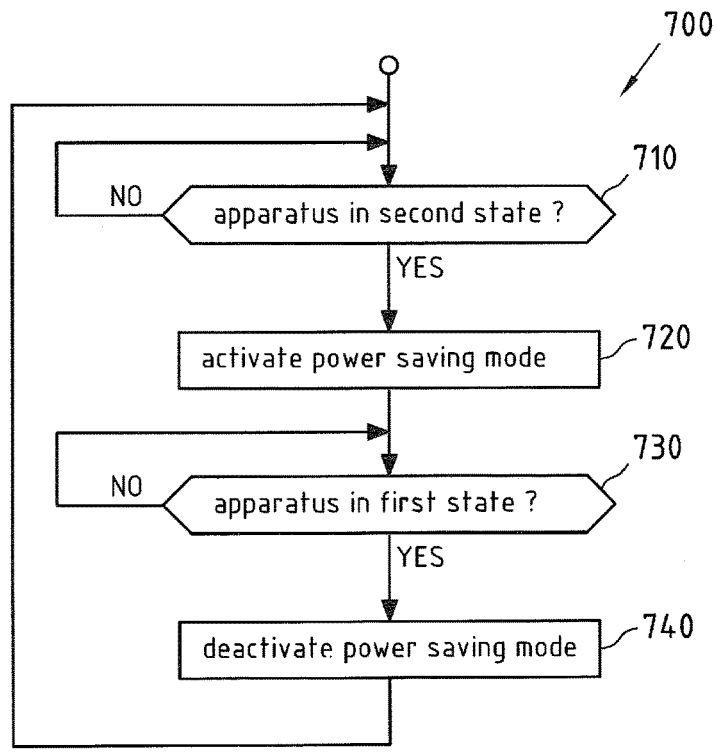
FIG. 7: a flowchart of a third example embodiment of a method according to an aspect of the invention.

FIG. 7 depicts a flowchart of a third example embodiment of a method 700 according to an aspect of the invention. The steps of this flowchart 500 may for instance be defined by respective program code 22 of a computer program 21 that is stored on a tangible storage medium 20, as shown in FIG. 1b. Tangible storage medium 20 may for instance embody program memory 11 of FIG. 1a, and the computer program 31 may then be executed by processor 10 of FIG. 1a. Thus, the method 500 may be performed by apparatus 10 or by any of the apparatuses 200, 300, 300' and 400.

In a step 710 it is checked whether the apparatus 400 is in the second state.

For instance, this checking may be performed based on the control signal on control signal line 470, 475 depicted in FIG. 4. Thus, if the control signal indicates that the apparatus is in the first state which may correspond to the status that the first rechargeable energy source is 620 is connected to the power connector 610 it is assumed that the apparatus is in the first state. If the control signal indicates the apparatus is in the second state which may correspond to the status that the first rechargeable energy source is 620 is disconnected from the power connector 610 it is assumed that the apparatus is in the second state and the method 700 proceeds with activating a power saving mode in a step 720.

For instance, the apparatus may comprise at least one electrical entity, and in the power saving mode activated in step 720 at least one of the at least one electrical entity is set to hardware power saving mode and/or at least one functionally of the apparatus, e.g. a software functionality, may be set to a power saving mode. As an example, at least one electrical entity of the at least one electrical entity may be powered down or at least be driven with reduced voltage in order save power, or some parts but not all parts of an electrical entity may be powered down. Furthermore, as an example, power consuming algorithms performed by software, e.g. performed by software on processor 11, might be stopped in the power saving mode. Furthermore, the power mode may also comprise a sleep mode for at least one electrical entity or the whole apparatus.

Thus, for instance, power hungry functions or hardware components, i.e. electrical entities, of the apparatus may be disabled or for the time the first rechargeable energy source is swapped, e.g. a radio frequency component and/or display light.

As an example, optional control signal line 475 depicted in FIG. 4 might be connected to at least one electrical entity in order to indicate the state of the apparatus such that the at least one electrical entity (not depicted in FIG. 4) can switch to the power save mode based on the control signal on control signal line 475.

Accordingly, in the power save mode power consumption of the apparatus can be reduced compared to power consumption of the apparatus not in the power save mode, i.e., a normal mode.

Thus, the time interval when sufficient energy can be provided from the second rechargeable energy source 240 can be extended due to the reduced power consumption of the apparatus in the power saving mode.

Then, in a step 730 it is checked whether the apparatus 400 is in the first state.

For instance, this checking may be performed based on the control signal on control signal line 470, 475 depicted in FIG. 4, as mentioned above.

If it is detected that the apparatus is in the first state, i.e., if the first rechargeable energy source is connected to the power connector 410, the method deactivates the power saving mode and the apparatus can be operated in the normal mode in which power consumption is higher than in the power saving mode.

Figure 8:
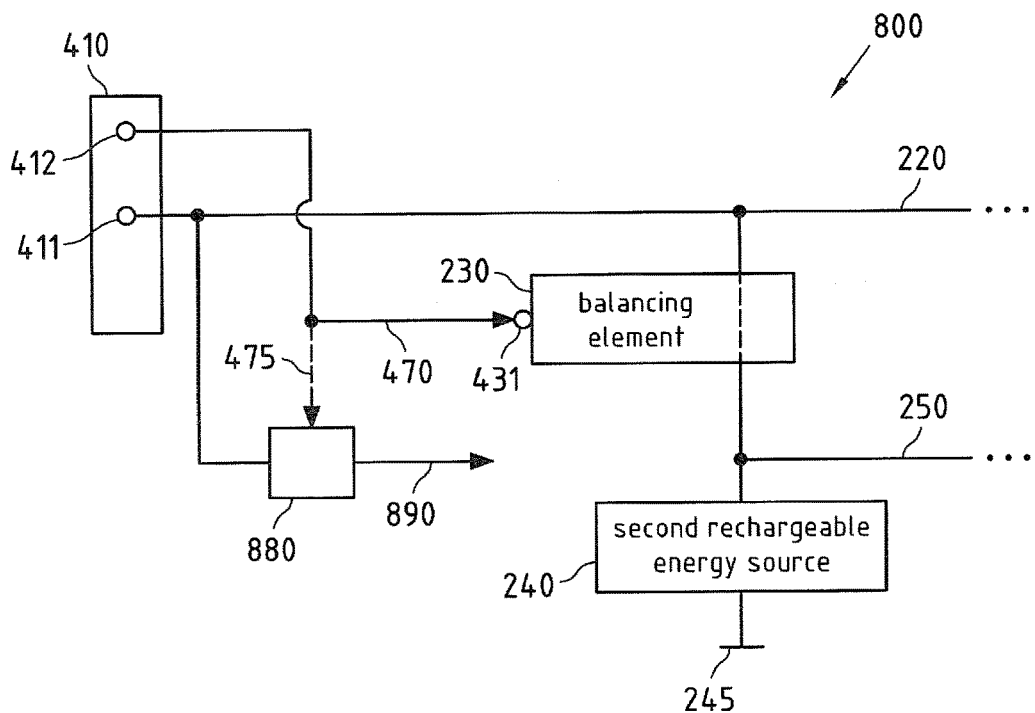
FIG. 8: a sixth example embodiment of an apparatus according to an aspect of the invention.

FIG. 8 depicts a sixth example embodiment of an apparatus 800 according to an aspect of the invention. For instance, this apparatus 800 may be based on the apparatus 10 depicted in FIG. 1a or on any of the apparatus 200, 300, 300', 400 depicted in FIGS. 2a, 3a, 3b, 3c, 3d and 4. Thus, the explanations presented above with respect to the apparatuses 11 and 200, 300, 300', 400 and presented with respect to any above mentioned method also hold for the sixth example embodiment of an apparatus 800 depicted in FIG. 8.

Compared to apparatus 400 depicted in FIG. 4, apparatus 800 shown in FIG. 8 comprises a voltage detector 880 connected to the power supply line 220, wherein the voltage detector 220 may be configured to output a second control signal on second control signal line 890 if the detected voltage is less than a predefined voltage level.

As an example, the predefined voltage level may represent a voltage being a little bit higher than the empty voltage level associated with the first rechargeable energy source and lower than the full voltage level associated with the fully charged first rechargeable energy source. Furthermore, as another example, the predefined voltage level may approximately or exactly represent empty voltage level associated with the first rechargeable energy source.

For instance, the second control signal on second control signal line 890 may be used by the apparatus 800 for indicating an information to a user via a user interface if the voltage level is less then the predefined voltage level. E.g., this information may inform the user that the first rechargeable energy source is nearly empty and that is advisable to replace the first rechargeable energy source with a fully charged first rechargeable energy source. As an example, this information may comprise an displaying an icon on a display, wherein this icon may represent a static icon or a blinking icon, or this information may be provided to the user via a LED, e.g. a blinking LED, or by means of any other well-suited kind of information transfer to the user.

Furthermore, in case the apparatus is operated in the second state, second control signal on second control signal line 890 may also be used by the apparatus for indicating an information to a user via a user interface if the voltage level is less then the predefined voltage level. For instance, this may information may then be indicative the energy of the second rechargeable energy source 240 is nearly empty and thus the user has to hurry up with replacing the first rechargeable energy source. For instance, the predefined voltage level used by the voltage detector 880 in the second state of the apparatus may differ from the predefined voltage level used by the voltage detector 880 in the first state of the apparatus, wherein the predefined voltage level associated with the second state may be adapted to an empty voltage level of the second rechargeable energy source 240, e.g., the predefined voltage level associated with the second state may represent a voltage being a little bit higher than the empty voltage level associated with the second rechargeable energy source 240 and lower than the full voltage level associated with the fully charged second rechargeable energy source. Furthermore, as another example, the predefined voltage level associated with the second state may approximately or exactly represent empty voltage level associated with the second rechargeable power supply. This empty voltage level may represent the minimum voltage level needed to keep the apparatus at least partially alive, e.g. in the normal mode or in the power saving mode.

For instance, method 500 depicted in FIG. 5 may be used for switching the apparatus 800 in the first or second state based on the voltage detected at the power supply line 220, wherein the first switching rule checked at step 520 may comprise a first voltage rule which may indicate to switch the apparatus 800 from the first state to the second state if the detected voltage is less than the above mentioned predefined voltage associated with the first state, and the second switching rule checked at step 540 may comprise a second voltage rule being associated with the first voltage rule of the first switching rule, wherein the second voltage rule may indicate to switch the apparatus 800 from the second state to the first state if the detected voltage exceeds the above mentioned predefined voltage associated with the second state.

Furthermore, as another example, the second control signal on second control signal line 890 may be used by the apparatus 800 to set at least one of the at least one electrical entity and/or at least one functionality of the apparatus in a power saving mode.

As an example, the method 700 depicted in FIG. 6b might be modified in a way that based on the status of the second control signal the activate power saving mode is activated in step 720 and is deactivated in step 740. For instance, in step 710 it might be determined whether the second control signal indicates that the detected voltage is less than the predefined voltage level, and if, the method proceeds with step 720. And in step 730 it might be determined whether the second control signal indicates that the detected voltage is not less than the predefined voltage level, and if, the method proceeds with step 740.

Furthermore, as another example, setting at least one of the at least one electrical entity and/or at least one functionality of the apparatus in a power saving mode based on the second control signal may be further based on the state of the apparatus, i.e., depending on whether the apparatus is in the first state or in the second state.

For instance, a first group of at least one electrical entity and/or at least one functionality of apparatus 800 may defined, wherein apparatus 800 is configured to set the at least one electrical entity and/or the at least one functionality of the first group in a power saving mode in case the second control signal indicates that the voltage is less the predefined voltage level, wherein this may be independent from the state of the apparatus 800, i.e. whether the apparatus 800 is in the first or the second state. As an example, this first group of at least one electrical entity and/or at least one functionality may comprise electrical entities or functionalities that are not so much important and does not limit normal operation of the apparatus 800 significantly. Accordingly, power consumption can be reduced compared to the normal mode without any reduction in power consumption thereby enhancing the time period until the first rechargeable energy source is empty.

As an example, the apparatus 800 may be configured to deactivate the power saving mode of the at least one electrical entity and/or the at least one functionality of the first group in case the second control signal indicates that the voltage is less the predefined voltage level independent from the state of the apparatus, or the apparatus 800 may be configured to deactivate the power saving mode of the at least one electrical entity and/or the at least one functionality of the first group in case the second control signal indicates that the voltage is less the predefined voltage level independent and if the apparatus is in the first state. For instance, in the latter case, it might be prevented that the power save mode of the first group is deactivated when the second rechargeable energy source 240 provided power to the power supply line 220 in the second state of the apparatus 800.

Furthermore, a second group of at least one electrical entity and/or at least one functionality of apparatus 800 may defined, wherein the at least one additional electrical entity and/or at eat least one functionality of the second group may represent additional entities or functionalities compared to the first group or wherein the second group may include the at least one electrical entity and/or at least one functionality of the first group and comprise at least one additional electrical entity and/or at least one additional functionality compared to the first group.

For instance, the apparatus 800 is configured to set the at least one electrical entity and/or the at least one functionality of the second group in a power saving mode in case the apparatus is in the second state, e.g., indicated by the control signal on control signal line 470, 475. Furthermore, for instance, the apparatus 800 is configured to deactivate the power saving mode of the at least one electrical entity and/or the at least one functionality of the second group in a power saving mode in case the apparatus is in the first state, e.g., indicated by the control signal on control signal line 470, 475.

Furthermore, as an example, a third group including at least one electrical entity and/or at least one functionality of apparatus 800 may be defined, wherein the at least one electrical entity and/or at least one functionality of the third group is only set in power saving mode in case both the apparatus is in the second state as well as the second control signal on control signal line 890 indicates that the voltage level is less then the predefined voltage. In this case, for instance, even important entities or functionalities may be set in the power saving mode.

Thus, different hierarchy levels for power saving modes may be defined, wherein each hierarchy level is associated with a group of at least one electrical entity and/or the at least one functionality of the apparatus 800, and wherein each hierarchy level may be associated with a predefined logical combination of at least the state of the apparatus 800, i.e., whether the apparatus is in the first or second state, and of the status of the second control signal. Thus, if a predefined logical combination associated with a hierarchy level is fulfilled, the respective at least one electrical entity and/or the at least one functionality of the group associated with this hierarchy level is set in power saving mode.

It has to be understood that the power saving mode mentioned with respect to apparatus 800 may comprise any power saving aspects presented with respect to method 700 depicted in FIG. 7.

Figure 9:
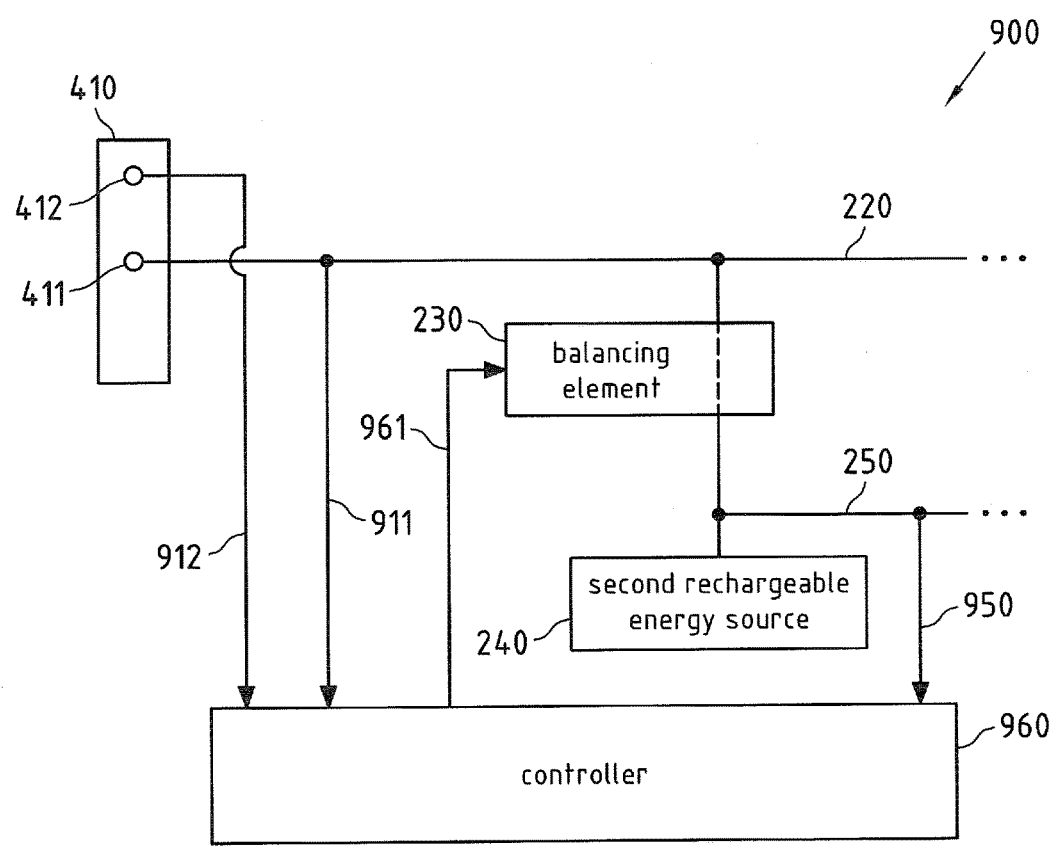
FIG. 9: a seventh example embodiment of an apparatus according to an aspect of the invention.

FIG. 9 depicts a seventh example embodiment of an apparatus 900 according to an aspect of the invention. For instance, this apparatus 900 may be based on the apparatus 10 depicted in FIG. 1a or on any of the apparatus 200, 300, 300', 400, 800 depicted in FIGS. 2a, 3a, 3b, 3c, 3d, 4 and 8. Thus, the explanations presented above with respect to the apparatuses 11 and 200, 300, 300', 400, 800 and presented with respect to any above mentioned method also hold for the sixth example embodiment of an apparatus 900 depicted in FIG. 8. Furthermore, method 500 depicted in FIG. 5 may be used for operating apparatus 900. For instance, the balancing element 230 may be realized by any of the above mentioned balancing elements 230, 230' and 330' depicted in FIGS. 2a, 3a, 3b, 3c and 3d.

Apparatus 900 comprises a controller 960 which is configured to determine whether the apparatus 900 is to be operated in the first state or in the second state. The controller 960 outputs a control signal 961 which controls the balancing element 230 accordingly, i.e., the controller 960 can operate the balancing element 230 in the first state or in the second state in accordance with control signal 961.

For instance, said controller 960 may apply the above mentioned first switching rule and second switching rule and may be configured to perform the method 500 depicted in FIG. 5, wherein the first switching rule comprises at least one rule associated with a switch of the apparatus from the first state into the second state and wherein the second switching rule comprises at least one rule associated with a switch of the apparatus from second state into first state.

As an example, the first switching rule may comprise the disconnect rule and the second switching rule may comprise the connect rule being associated with the disconnected rule, wherein the signal provided by optional signal line 912 may be used for determining whether the disconnect rule is fulfilled in step 520 and may be used for determining whether the connect rule is fulfilled in step 540.

Or, as another example, the first switching rule may comprise the first voltage rule and the second switching rule may comprise the second voltage rule which represents the rule of the second switching rule being associated with the first voltage rule, wherein the controller 960 may configured to switch from the first state into the second state if it is determined in step 520 that the first voltage rule is fulfilled based on the voltage on optional line 911, and wherein the controller 960 may be configured to switch from the second state into the first state if it is determined in step 540 that the second voltage rule is fulfilled based on the voltage on optional line 911.

Or, as another example, the first switching rule may comprise a first combined voltage rule, wherein this first combined voltage rule may indicate to switch the apparatus 900 from the first state in the second state if the voltage at the power supply line 220 is less than a first predefined voltage level and the voltage at the second power supply line 250 exceeds a second predefined voltage level, and, optional, if it is detected that the first energy source is connected to the power connector 410, e.g. based on the connect rule. The first predefined voltage level is lower than the second predefined voltage level. Thus, this first combined voltage rule may be used to detect an under voltage of the first rechargeable energy source compared to the voltage of the second rechargeable energy source 240. For instance, said first predefined voltage level may be 3.4V and the second predefined voltage level may be 4.4V, but any other well-suited voltage levels may be used as well, e.g. depending on the type of rechargeable energy sources. Thus, when the apparatus 900 is switched in second state in step 530, the balancing element 230 provides power from the second energy source 240 to the first energy source which may include charging the first energy source. For instance, in this second state and if the first combined voltage rule was fulfilled, the balancing element 230 may be controlled to balance the voltages of the power supply line 220 and the second power supply line 240 to a voltage level between the first predefined voltage level and the second predefined voltage level, wherein this voltage level may for instance represent the arithmetic mean between the first and second predefined voltage level.

Furthermore, the second switching rule may comprise a third voltage rule being associated with the first combined voltage rule, wherein this third voltage rule may indicate to switch the apparatus 900 from the second state in the first state if the under voltage of the first energy source is not present anymore. For instance, this third voltage rule may indicate to switch to the first state if the voltage of the power supply line 220 exceeds a third predefined level. Furthermore, this third voltage rule may indicate to switch to the first state of the voltage of the power supply line 220 exceeds the third predefined level and the voltage of the second power supply line 250 is less than a fourth predefined level, wherein the third predefined level is higher than the fourth predefined level. Accordingly, the controller may be configured to detect that the third voltage rule is fulfilled in step 540 and may be configured to switch the apparatus in the first state in step 510.

For instance, the controller 960 may be configured to monitor different relevant voltages of the apparatus and/or currents floating in the apparatus 900 and may apply rules of the first switching rule in order to switch the apparatus from the first into the second state and may apply rules of the second switching rules in order to switch the apparatus from the second state into the first state. For instance, said rules may consider specific rules associated with the first energy source and/or the second energy source 240, e.g. its capacity, its state of charge (Soc), its voltage, and so on, wherein the controller 960 may be configured to switch the balancing element 230 in the first state or in the second state in order to support an optimized point of operation of the apparatus 900.

Thus, as a further example, controller 960 may be configured to monitor at least one rule regarding the energy management of the apparatus 900, wherein in accordance with a fulfilled rule of the at least one rule a predefined energy flow is regulated (or controlled) between at least two of the first rechargeable energy source (or power supply line 220), the second rechargeable energy source 240, and, optionally, the at least one electrical entity connected to the second power supply line, and, optionally, at least one charger in accordance with the respective rule.

For instance, the at least one charger may represent an internal charger of apparatus 900 (not depicted in FIG. 9) or may represent an external charger, wherein apparatus 900 is be configured to be connected to the external charger, e.g., apparatus 900 may comprise a charger interface being configured to connect to said external charger, wherein the internal charger or the charger interface is connected to the balancing element 230 such that the balancing element 230 may regulate or control energy flow from the charger to at least one of the first rechargeable energy source, the power supply line 220, the second rechargeable energy source 240, and, optionally, the at least one electrical entity connected to the second power supply line in accordance with a rule of the at least one rule. For instance, this rule may define that the balancing element 230 regulates or controls the above mentioned energy flow from the charger if a voltage detected at the charger (or the charger interface) exceeds a predefined voltage threshold and/or if the current provided from the charger exceeds a predefined current threshold. As non-limiting example, this predefine voltage threshold may represent 5.5V, 6V, 6.5V or another other well-suited threshold, and the predefined current threshold may represent 0.8 A, 1 A, 1.2 A or any other well-suited threshold. Thus, for instance, if said charger is detected by the controller 960, the balancing element 230 may be switched in a state for providing drawing energy from the charger to at least one of the first rechargeable energy source, the power supply line 220, the second rechargeable energy source 240, and, optionally, the at least one electrical entity connected to the second power supply line via the balancing element 230. As a non-limiting example, the balancing element 230 may be configured to draw energy from the charger and to apply approximately 2 W or a maximum of 2 W or at least 2 W energy to the first rechargeable energy source, and/or to apply approximately 2 W or a maximum of 2 W or at least 2 W energy to the second rechargeable energy source 240, and/or approximately 1 W or a maximum of 1 W or at least 1 W energy to electrical entities connected to the second power supply line 250 and or to the power supply line 220.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

With respect to the aspects of the invention and their embodiments described in this application, it is understood that a disclosure of any action or step shall be understood as a disclosure of a corresponding (functional) configuration of a corresponding apparatus (for instance a configuration of the computer program code and/or the processor and/or some other means of the corresponding apparatus), of a corresponding computer program code defined to cause such an action or step when executed and/or of a corresponding (functional) configuration of a system (or parts thereof).

The aspects of the invention and their embodiments presented in this application and also their single features shall also be understood to be disclosed in all possible combinations with each other. In particular, the different rules presented in this application shall also be understood to be disclosed in all possible combinations with each other. It should also be understood that the sequence of method steps in the flowcharts presented above is not mandatory, also alternative sequences may be possible.

The invention has been described above by non-limiting examples. In particular, it should be noted that there are alternative ways and variations which are obvious to a skilled person in the art and can be implemented without deviating from the scope and spirit of the appended claims.

The invention claimed is:

1. An apparatus, comprising:
a power connector configured to be connected to a removable first rechargeable energy source and configured to supply power from the first rechargeable energy source to the apparatus via a power supply line;
a second rechargeable energy source;
a balancing element placed between the power supply line and the second rechargeable energy source and configured to provide power from the power supply line to the second rechargeable energy in a first state of the apparatus and further configured to provide power from the second rechargeable energy source to the power supply line in a second state of the apparatus;
wherein the balancing element comprises a regulator and a switch,
wherein the regulator and the switch are connected in parallel between the power supply line and the second rechargeable energy source; and
a controller, including at least one processor and memory, and configured to implement code to cause to switch the apparatus from the first state to the second state if a first switching rule is fulfilled and further configured to implement code to cause to switch the apparatus from the second state to the first state if a second switching rule is fulfilled.

2. The apparatus according to claim 1, wherein the regulator is configured to draw power from the power supply line and to charge the second rechargeable energy source in the first state,
wherein in the first state the apparatus is configured to prevent supplying power from the second rechargeable power supply to the power supply line,
wherein in the second state the apparatus is configured to prevent supplying power from the first rechargeable power supply to the power supply line.

3. The apparatus according to claim 1, wherein in the first state the switch is configured to disconnect the second rechargeable energy source from the power supply line and in the second state the switch is configured to connect the second rechargeable energy source with the power supply line.

4. The apparatus according to claim 2, wherein in the second state the regulator is configured to draw power from the second rechargeable energy source in order to provide power to the power supply line.

5. The apparatus according to claim 1, wherein the second rechargeable energy source is a battery.

6. The apparatus according to claim 1, wherein said first switching rule comprises at least one of:
a disconnect rule associated with a connecting status of the first rechargeable energy source with respect to the power connector,
a first voltage rule indicating that the voltage at the power supply line is less than a predefined voltage associated with the first state, and
a first combined voltage rule based on the voltage at the power supply line and on the voltage at the second rechargeable energy source indicating an under voltage of the voltage of the power supply line with respect to the voltage of the second rechargeable energy source.

7. The apparatus according to claim 1, wherein said second switching rule comprises at least one of:
a connect rule associated with a connecting status of the first rechargeable energy source with respect to the power connector,
a second voltage rule indicating that the voltage at the power supply line exceeds a predefined voltage associated with the second state, and
a third voltage rule based on the voltage at the power supply line indicating that there is no under voltage of the voltage of the power supply line.

8. The apparatus according to claim 6, further comprising a control signal line configured to indicate the connecting status of the first rechargeable energy source, wherein the power connector comprises a plurality of contacts configured to be connected to respective contacts of the first rechargeable battery, wherein the signal of the control signal line depends on the signal of a first contact of the plurality of contacts of the power connector.

9. The apparatus according to claim 8, wherein at least two contacts of the plurality of contacts of the power connector are associated with ground and power, and wherein the first contact and the at least two contacts associated with ground and power of the power connector are arranged in a way that the first contact loses contact with the respective contact of the first rechargeable energy source before one of the at least two contacts loses contact with the respective contact of the first rechargeable energy source when the rechargeable energy source is removed from the power connector.

10. The apparatus according to claim 1, further comprising at least one electrical entity, wherein in
the second state the apparatus is configured to set at least one of the at least one electrical entity in a power saving mode and/or at least one functionally of the apparatus in the power saving mode.

11. The apparatus according to claim 10, wherein the apparatus is configured to set at least one of the at least one electrical entity and/or at least one functionality of the apparatus in the power saving mode based on a control signal that is based on which state the apparatus is in, wherein a first group of at least one electrical entity and/or at least one functionality is set in the power saving mode based on the control signal when the apparatus is not in the second state, and wherein a second group of at least one electrical entity and/or at least one functionality is set in the power saving mode based on the second control signal when the apparatus is in the second state.

12. A method performed by an apparatus including a removable first rechargeable energy source, a second rechargeable energy source, a power connector configured to be connected to the removable first rechargeable energy source and configured to supply power from the first rechargeable energy source to the apparatus via a power supply line, and a balancing element placed between the power supply line and the second rechargeable energy source, the method comprising:
operating the apparatus in a first state in which power from the power supply line is provided to the second rechargeable energy source via the balancing element and decoupling the second rechargeable energy source from the power supply line such that power supply from the second rechargeable energy source to the power supply line is prevented;
implementing code, utilizing a controller including at least one processor and memory, wherein the code is configured to cause to switch the apparatus from a first state to a second state if a first switching rule is fulfilled and further configured to cause to switch the apparatus from the second state to the first state if a second switching rule is fulfilled;
changing the status of the apparatus from the first state into a second state; and
in the second state providing power from the second rechargeable energy source to the power supply line via the balancing element,
wherein the balancing element comprises a regulator and a switch, and
wherein the regulator and the switch are connected in parallel between the power supply line and the second rechargeable energy source.

13. The method according to claim 12, the method further comprising drawing power from the power supply line by the regulator and charging the second rechargeable energy source via the regulator in the first state,
wherein in the first state the apparatus is configured to prevent supplying power from the second rechargeable power supply to the power supply line,
wherein in the second state the apparatus is configured to prevent supplying power from the first rechargeable power supply to the power supply line.

14. The method according to claim 13, wherein in the second state the regulator and the switch are configured to draw power from the second rechargeable energy source by closing the switch in order to provide power to the power supply line.

15. The method according to any of claims 12, wherein the second rechargeable energy source is a battery.

16. The method according to claim 12, wherein said first switching rule comprises at least one of:
a disconnect rule associated with a connecting status of the first rechargeable energy source with respect to the power connector,
a first voltage rule indicating that the voltage at the power supply line is less than a predefined voltage associated with the first state, and
a first combined voltage rule based on the voltage at the power supply line and on the voltage at the second rechargeable energy source indicating an under voltage of the voltage of the power supply line with respect to the voltage of the second rechargeable energy source.

17. The method according to claim 12, wherein said second switching rule comprises at least one of:
a connect rule associated with a connecting status of the first rechargeable energy source with respect to the power connector,
a second voltage rule indicating that the voltage at the power supply line exceeds a predefined voltage associated with the second state, and
a third voltage rule based on the voltage at the power supply line indicating that there is no under voltage of the voltage of the power supply line.

18. The method of claim 12, wherein the apparatus further comprises at least one electrical entity, the method further comprising setting at least one of the at least one electrical entity in a power saving mode and/or at least one functionally of the apparatus in the power saving mode in the second state.

19. The method according to claim 18, comprising setting at least one of the at least one electrical entity and/or at least one functionality of the apparatus in the power saving mode based on a control signal that is based on which state the apparatus, wherein a first group of at least one electrical entity and/or at least one functionality is set in the power saving mode based on the control signal when the apparatus is not in the second state, and wherein a second group of at least one electrical entity and/or at least one functionality is set in the power saving mode based on the second control signal when the apparatus is in the second state.

20. A non-transitory computer-readable storage medium carrying one or more sequences of one or more instructions which, when executed by one or more processors, cause an apparatus including a removable first rechargeable energy source, a second rechargeable energy source, a power connector configured to be connected to the removable first rechargeable energy source and configured to supply power from the first rechargeable energy source to the apparatus via a power supply line, and a balancing element placed between the power supply line and the second rechargeable energy sauce, to at least perform the following steps:
operating in a first state in which power from the power supply line is provided to the second rechargeable energy source via the balancing element and to decouple the second rechargeable energy source from the power supply line such that power supply from the second rechargeable energy source to the power supply line is prevented;

implementing code, utilizing a controller including at least one processor and memory, wherein the code is configured to cause to switch the apparatus from a first state to a second state if a first switching rule is fulfilled and further configured to cause to switch the apparatus from the second state to the first state if a second switching rule is fulfilled;

changing the status of the apparatus from the first state into a second state; and in the second state providing power from the second rechargeable energy source to the power supply line via the balancing element, wherein the balancing element comprises a regulator and a switch, and wherein the regulator and the switch are connected in parallel between the power supply line and the second rechargeable energy source.

* * * * *